(12) United States Patent
Sharman et al.

(10) Patent No.: US 8,743,280 B2
(45) Date of Patent: Jun. 3, 2014

(54) SCAN CONVERSION IMAGE FILTERING

(75) Inventors: Karl James Sharman, Eastleigh (GB); James Edward Burns, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1799 days.

(21) Appl. No.: 11/908,082

(22) PCT Filed: Oct. 27, 2006

(86) PCT No.: PCT/GB2006/004037
§ 371 (c)(1),
(2), (4) Date: Sep. 7, 2007

(87) PCT Pub. No.: WO2007/051997
PCT Pub. Date: May 10, 2007

(65) Prior Publication Data
US 2008/0204593 A1 Aug. 28, 2008

(30) Foreign Application Priority Data
Oct. 31, 2005 (GB) .................................. 0522159.3

(51) Int. Cl.
*H04N 7/01* (2006.01)
*H04N 11/20* (2006.01)
*H04N 5/205* (2006.01)
*H04N 5/14* (2006.01)

(52) U.S. Cl.
CPC ............... *H04N 7/012* (2013.01); *H04N 5/205* (2013.01); *H04N 5/142* (2013.01); *H04N 5/144* (2013.01)
USPC ............ 348/448; 348/451; 348/452; 382/260

(58) Field of Classification Search
CPC ....... H04N 7/01; H04N 7/012; H04N 7/0135; H04N 7/0137; H04N 7/014; H04N 7/0145; G09G 2310/0229; G09G 2340/0407; G09G 2340/0457
USPC ................... 348/448, 452; 382/260–265, 300
See application file for complete search history.

(56) References Cited

U.S. PATENT DOCUMENTS 4,943,847 A * 7/1990 Katznelson ................... 348/487
5,260,786 A * 11/1993 Kawashima et al. ......... 348/452

(Continued)

FOREIGN PATENT DOCUMENTS

| EP | 1 191 785 | 3/2002 |
| EP | 1 313 310 | 5/2003 |

(Continued)

OTHER PUBLICATIONS

Office Action issued Oct. 18, 2011 in Japan Application No. 2008-537199 (With English Translation).

(Continued)

*Primary Examiner* — Benjamin R Bruckart
*Assistant Examiner* — Carmine Malangone
(74) *Attorney, Agent, or Firm* — Oblon, Spivak, McClelland, Maier & Neustadt, L.L.P.

(57) ABSTRACT

An image processing apparatus in which output pixels of an output image are generated with respect to input pixels of an input image, a first subset of the output pixels being identical to respective input pixels and a second subset of the output pixels being derived from respective groups of one or more input pixels. The apparatus includes a spatial filter arrangement for filtering the second subset of pixels, the filter not being applied to filter the first subset of output pixels, the filter arrangement having a response such that high spatial frequencies are attenuated in the output image.

15 Claims, 18 Drawing Sheets

(56) References Cited

U.S. PATENT DOCUMENTS

Figure 1:
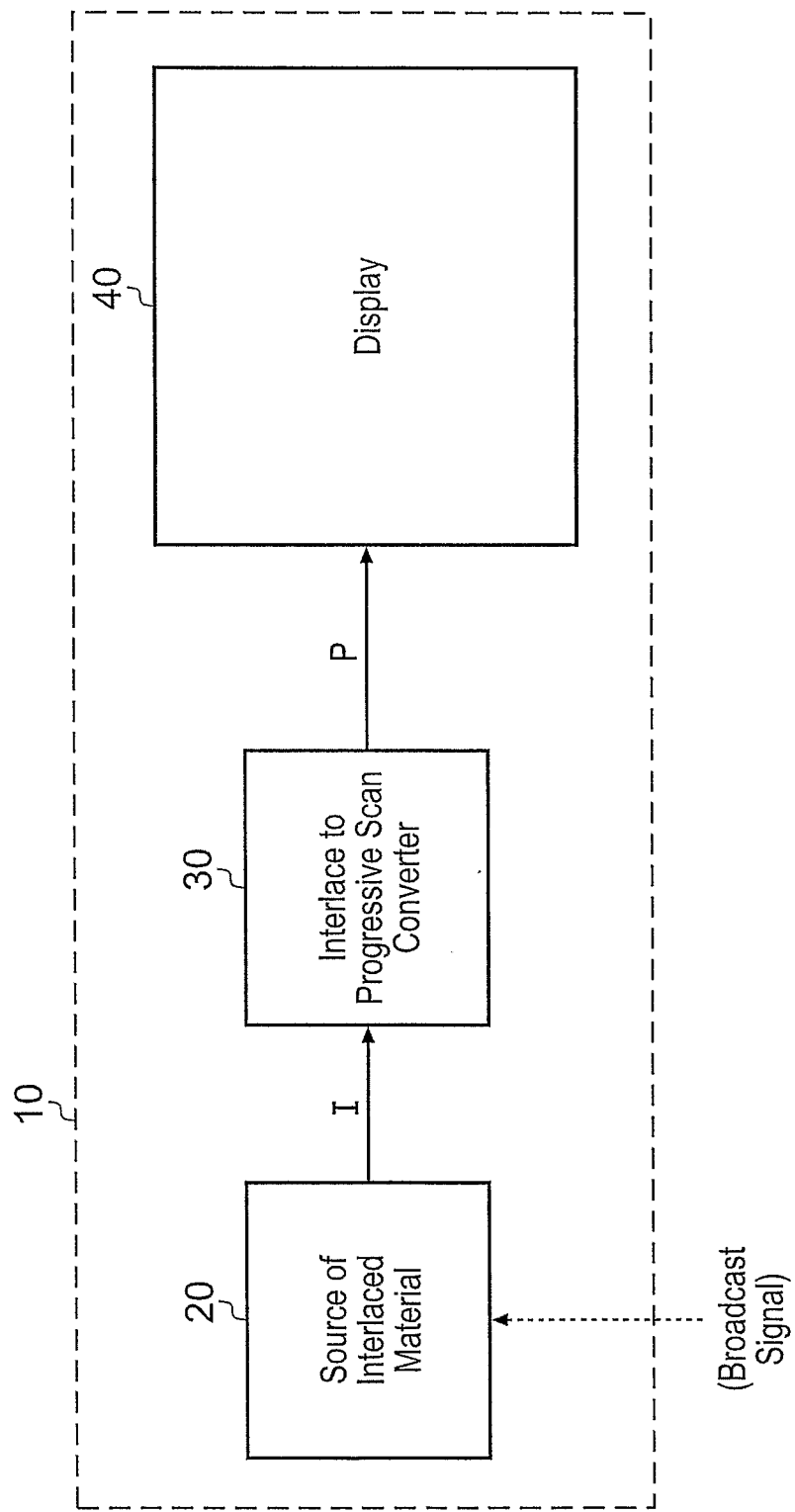

| | | | |
|---|---|---|---|
| 5,337,089 A | | 8/1994 | Fisch |
| 5,450,214 A | * | 9/1995 | Nobuoka .................. 358/479 |
| 5,619,272 A | | 4/1997 | Salmon et al. |
| 6,545,719 B1 | | 4/2003 | Topper |
| 8,000,534 B2 | | 8/2011 | Sharman |
| 8,358,374 B2 | | 1/2013 | Sharman |
| 2004/0257467 A1 | * | 12/2004 | Nicolas .................. 348/452 |
| 2005/0253964 A1 | * | 11/2005 | Janssen et al. ............ 348/459 |
| 2006/0290806 A1 | * | 12/2006 | MacInnis .................. 348/448 |
| 2008/0137750 A1 | | 6/2008 | Burns et al. |
| 2010/0045862 A1 | | 2/2010 | Burns et al. |

FOREIGN PATENT DOCUMENTS

| | | |
|---|---|---|
| EP | 1 411 719 | 4/2004 |
| JP | 2001-320679 | 11/2001 |
| WO | 97 16923 | 5/1997 |

OTHER PUBLICATIONS

Chinese Office Action issued Jul. 18, 2011, in Patent Application No. 200680037436.1 (English Translation Only).

* cited by examiner

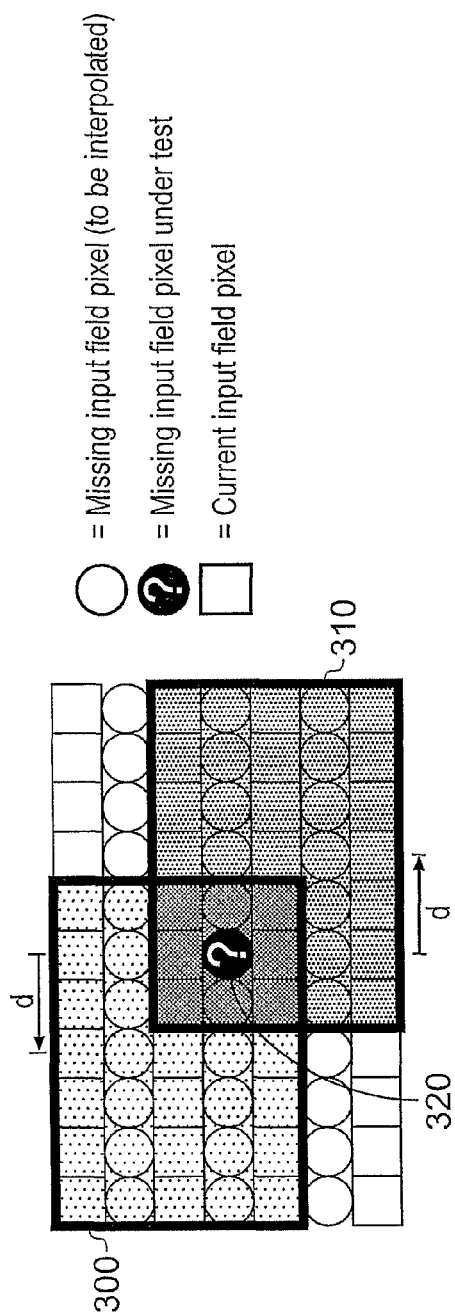
Fig. 5
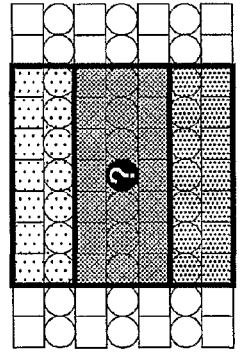
Fig. 6C
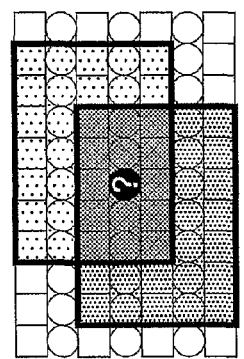
Fig. 6B
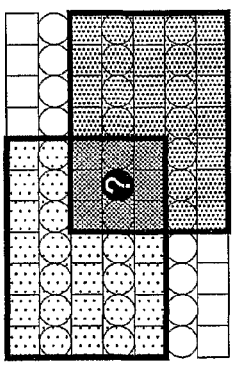
Fig. 6E
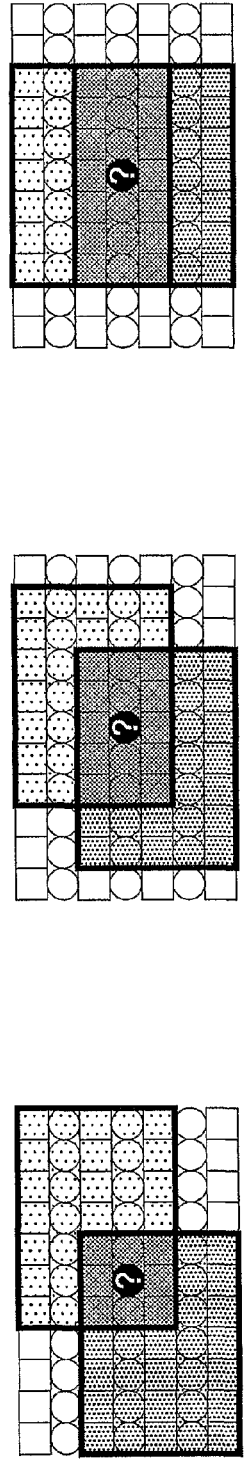
Fig. 6A
Fig. 6D

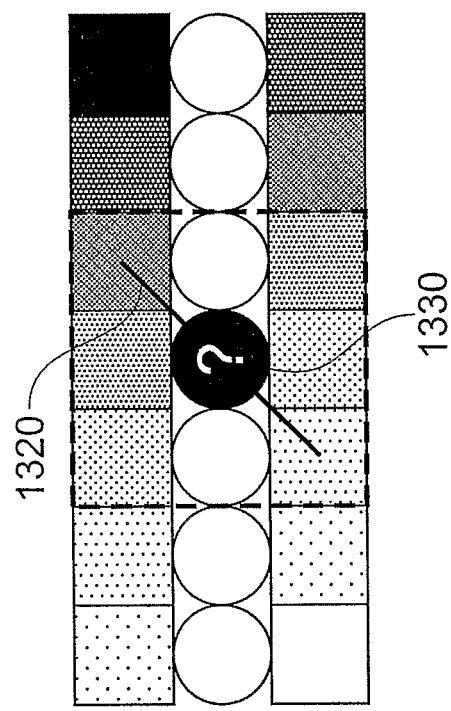
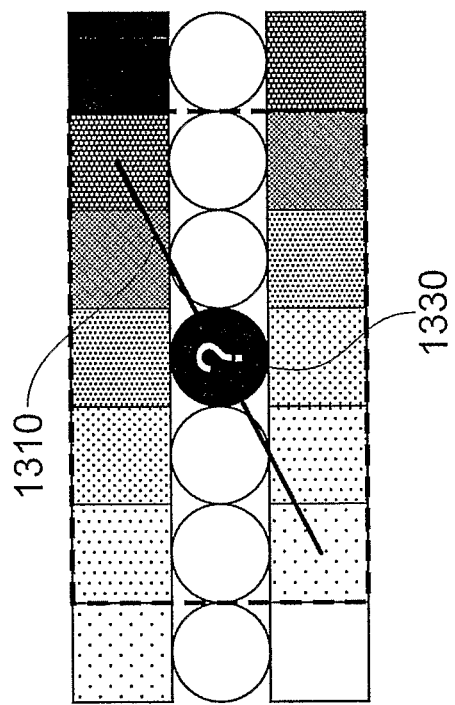
Fig. 22A
Fig. 22B

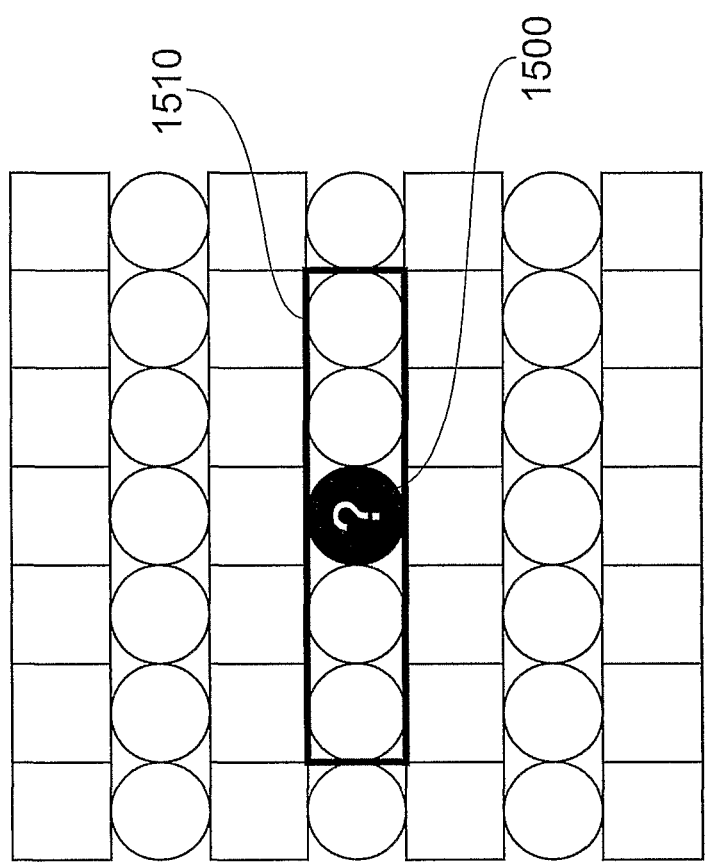

SCAN CONVERSION IMAGE FILTERING

This invention relates to image processing.

Video image capture represents a spatial and temporal sampling process. An image is captured as a set of pixels arranged in rows or lines. Successive images are captured at spaced instants in time.

The smallest detail that can be reproduced in the image is a single pixel. Ideally, each of the smallest details of the original scene should be represented by one pixel in the captured image.

In practice, however, some of the details in the scene fall between pixel lines, so two pixel lines are required for such small details. Thus some vertical resolution can be lost. Measurements of this effect show that only about 70% of the vertical detail which ought to be captured is in fact provided by the pixel lines. This factor (70%) is known as the Kell-factor.

Some authorities assert that the effect quantified Kell-factor applies irrespective of the manner of image scanning, i.e. whether the lines follow each other sequentially (progressive scan) or alternately (interlaced scan). Other authorities assert that the Kell-factor relates only to the degradation caused by interlacing.

In the present description, it is those effects relating to the Kell-factor which are dependent upon the image being interlaced which are considered. In these circumstances, it is generally considered that only 70% (the Kell-factor) of the possible vertical bandwidth is (or should be) represented. But in fact any effect which gives rise to the source material not making full use of its available bandwidth is also contemplated.

It will of course be appreciated that the figure of 70% is a mere approximation for the purposes of the present description.

Hence if an interlaced to progressive scan conversion is being carried out, it is potentially hazardous to attempt to produce a full vertical bandwidth image. Instead, a compensation to account for a Kell-factor of less than unity may be used. For the same reason it may also be potentially hazardous to produce a full horizontal bandwidth image.

This invention provides image processing apparatus in which output pixels of an output image are generated with respect to input pixels of an input image, a first subset of the output pixels being identical to respective input pixels and a second subset of the output pixels being derived from respective groups of one or more input pixels, the apparatus comprising:

a spatial filter arrangement for filtering the second subset of pixels, the filter not being applied to filter the first subset of output pixels, the filter arrangement having a response such that high spatial frequencies are attenuated in the output image.

The invention recognises that a simple approach to Kell-factor filtering of an image generated as defined above (i.e. just to filter the entire output image with a 70% bandwidth vertical low-pass filter) would not be expected to produce a useful result. This is because some of the pixels in the output image correspond to pixels in an input image which has already been captured or generated by a technique which limits the vertical bandwidth by the Kell-factor.

In contrast, in the present invention, such pre-existing pixels are not altered by the filtering operation.

Preferably the input image is an interlaced image; and the output image is a progressive scan image. However, the invention is applicable to any case where there is a mixture of source pixels and modified pixels.

Further respective aspects and features of the invention are defined in the appended claims.

Figure 2:
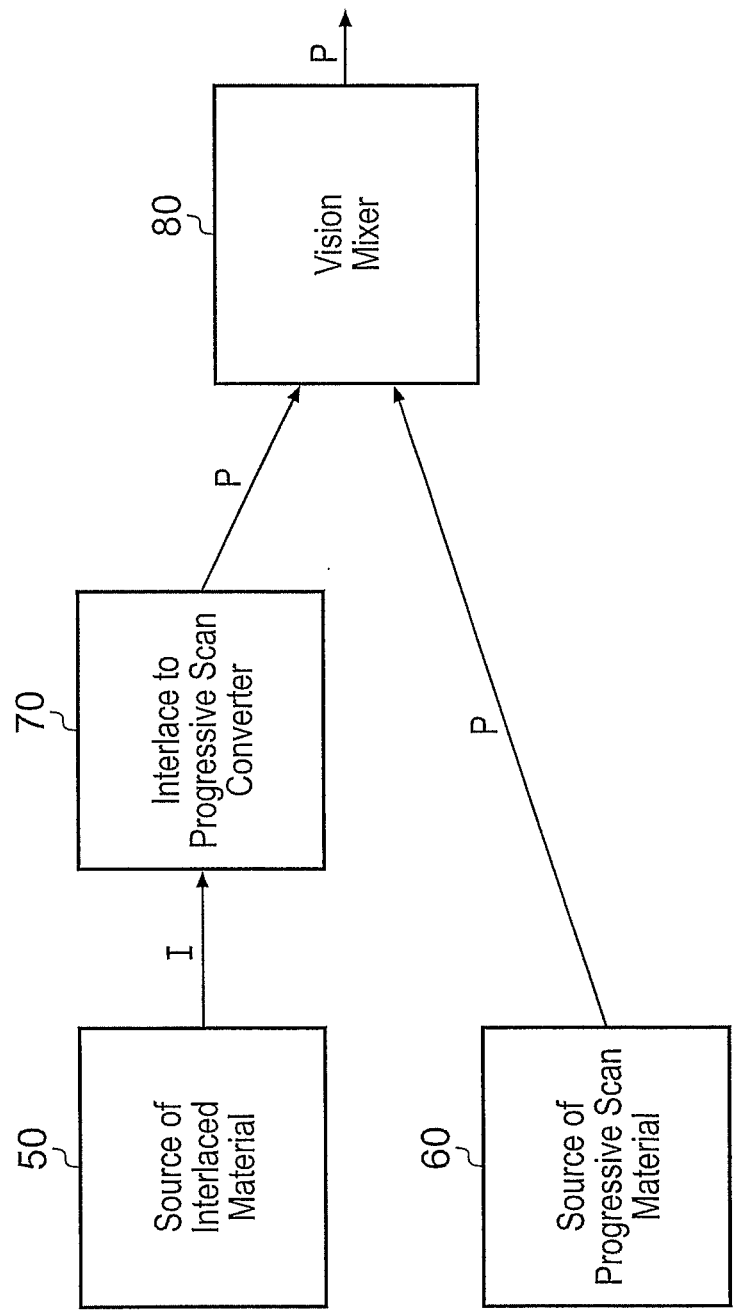
Figure 3:
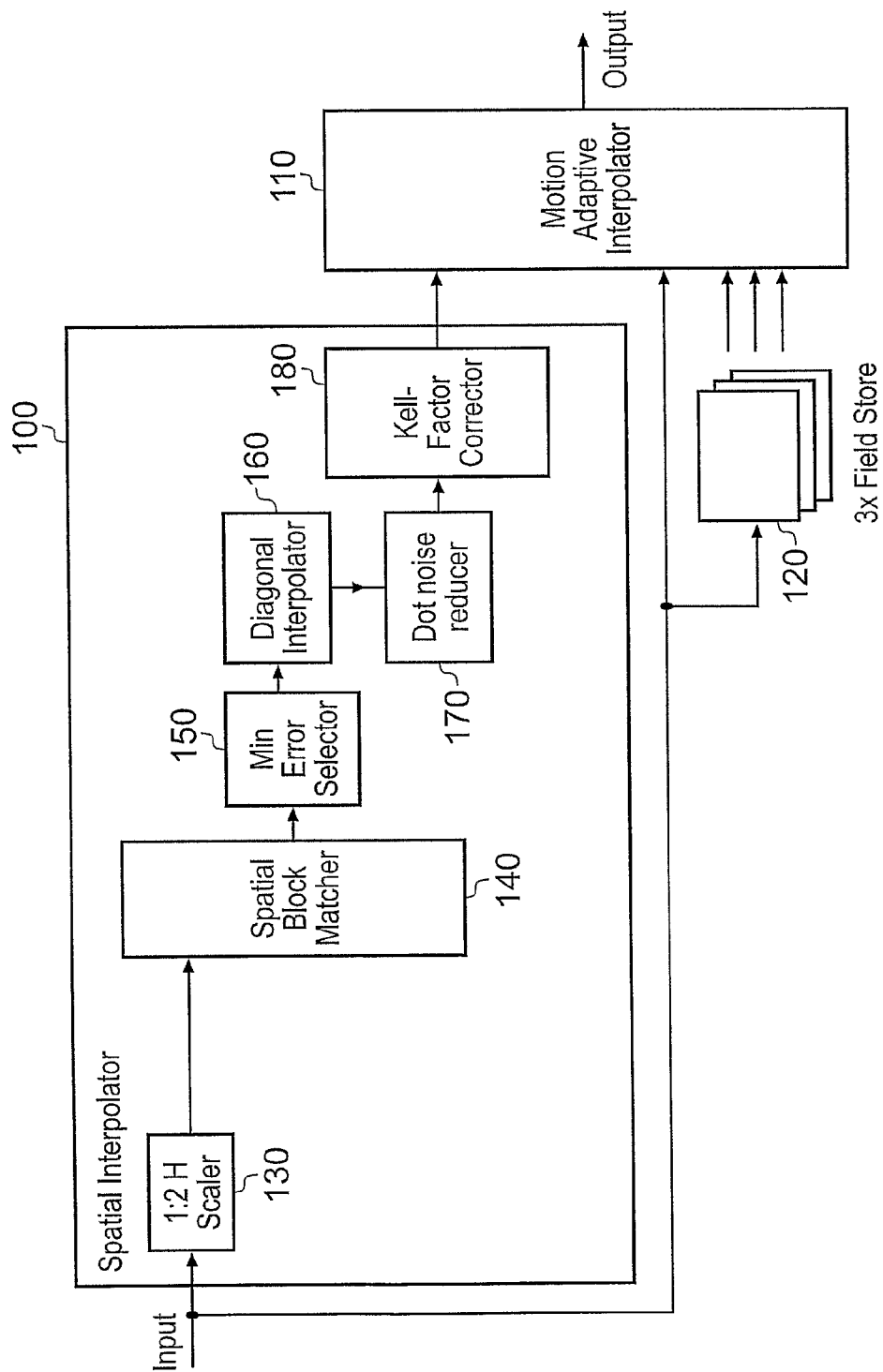
Figure 4:
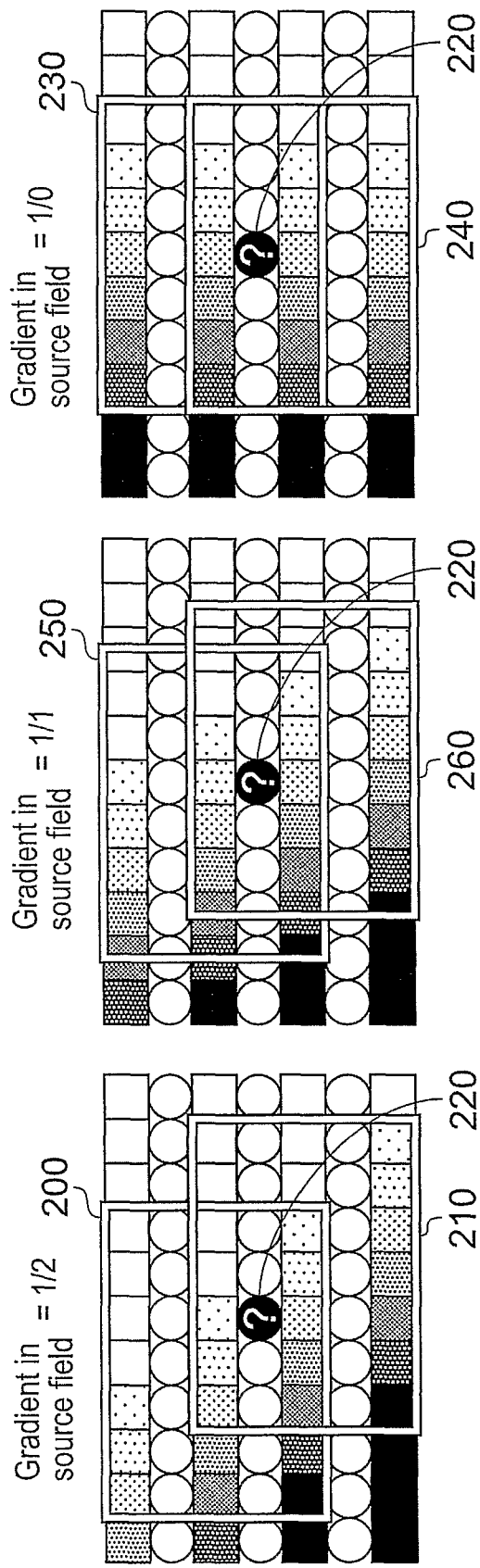
Figure 7A:
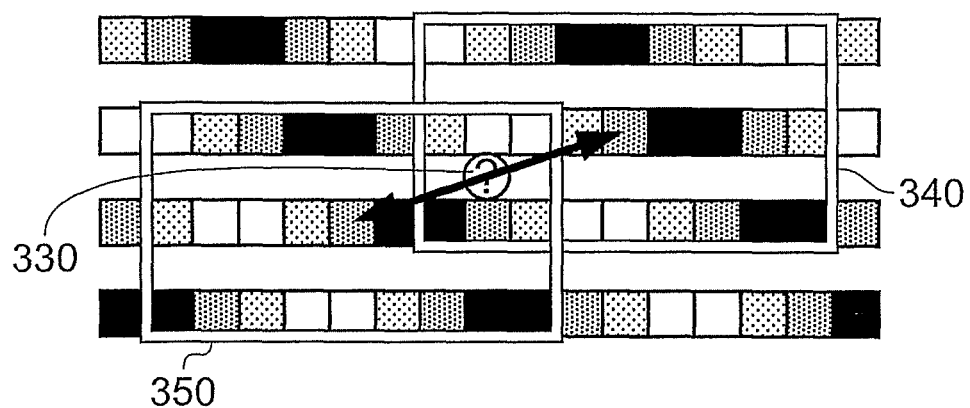
Figure 7B:
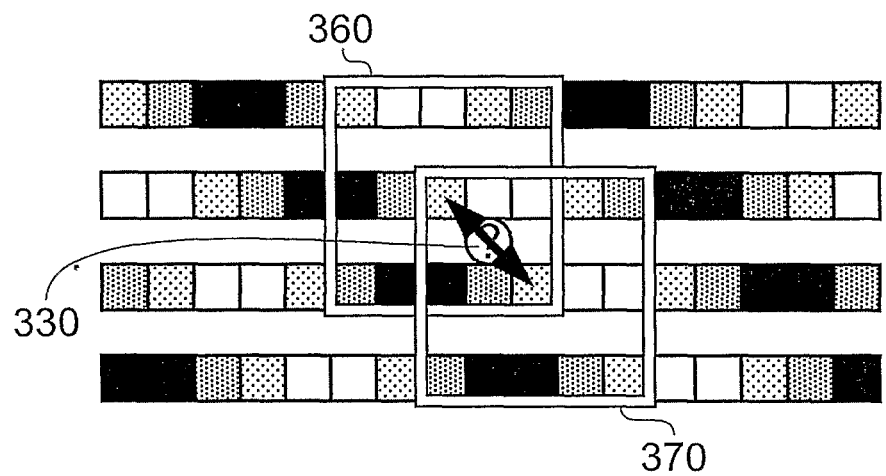
Figure 9:
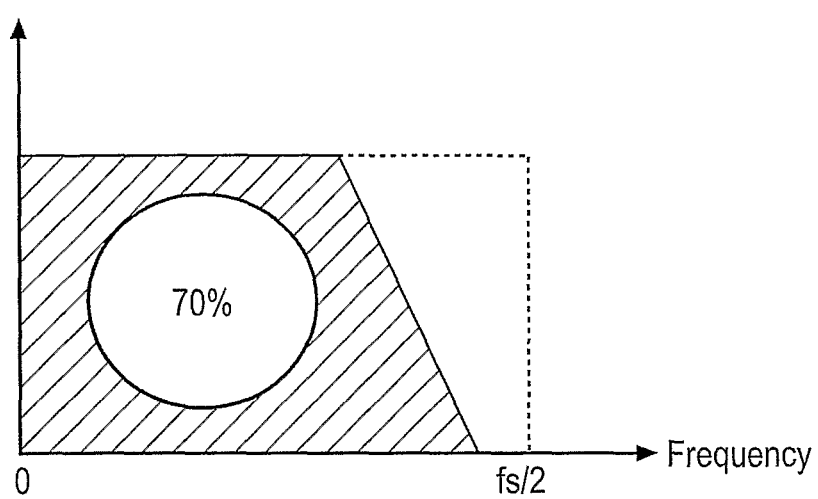
Figure 10:
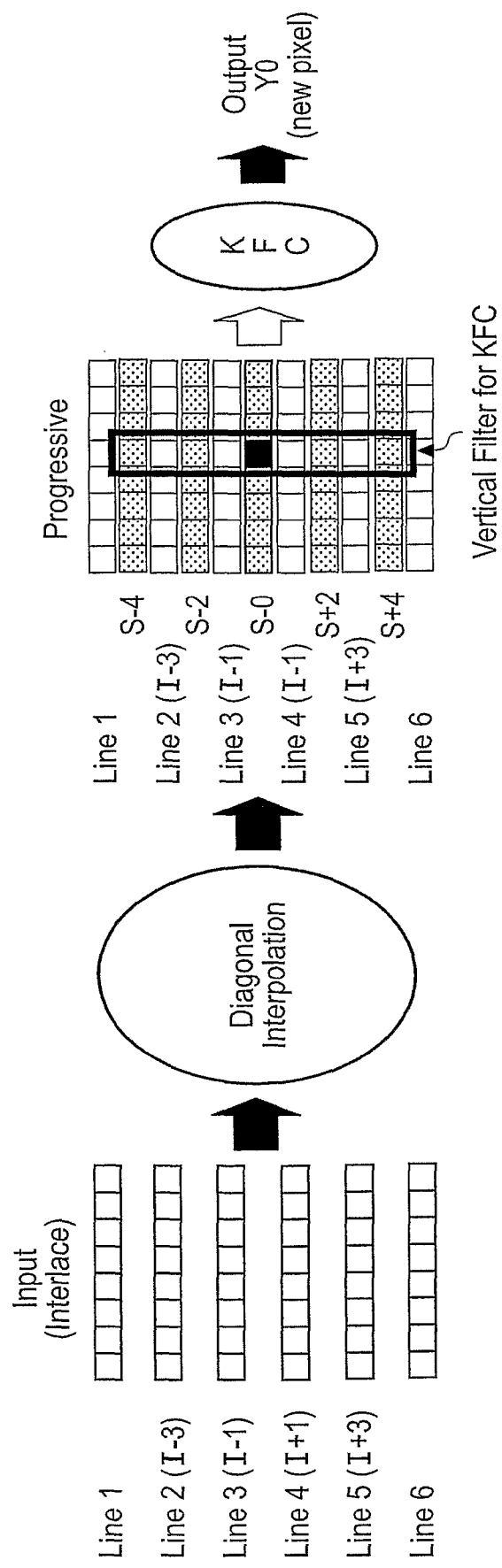
Figure 11:
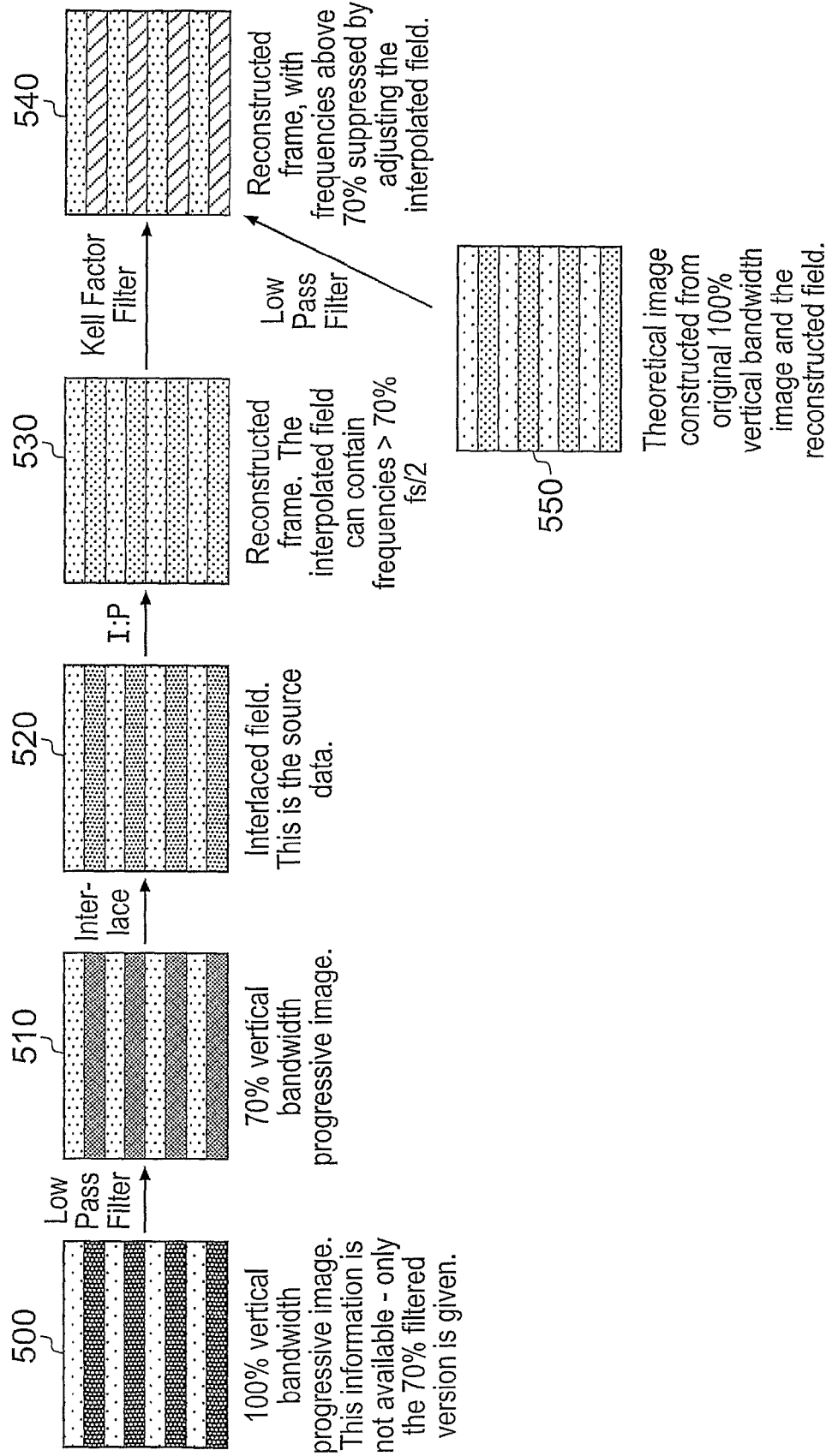
Figure 12A:
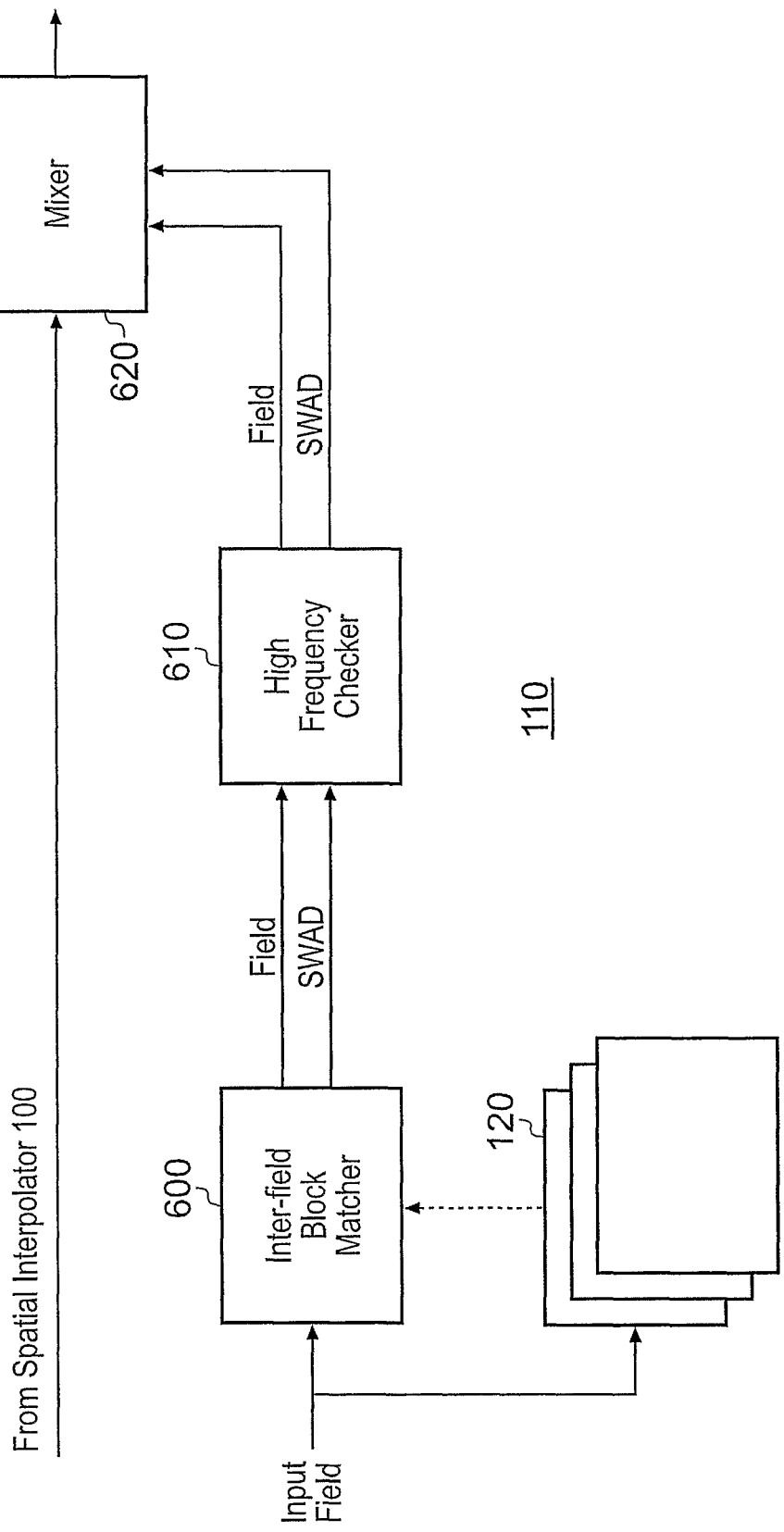
Figure 12B:
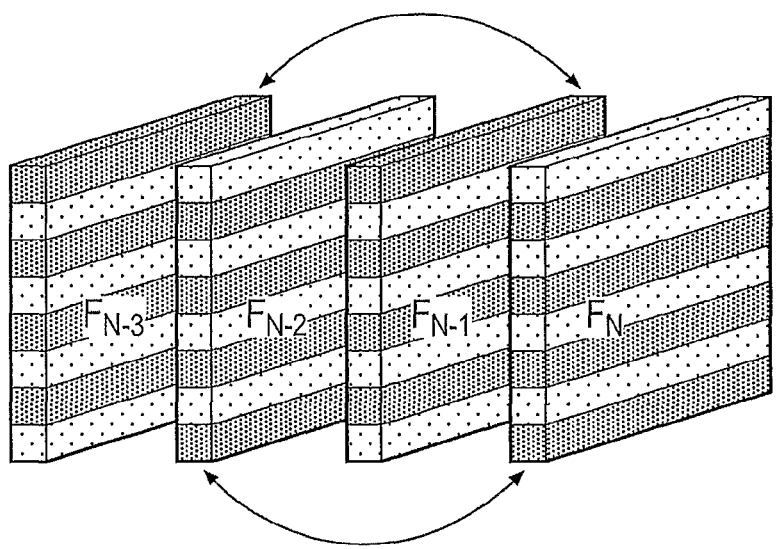
Figure 13:
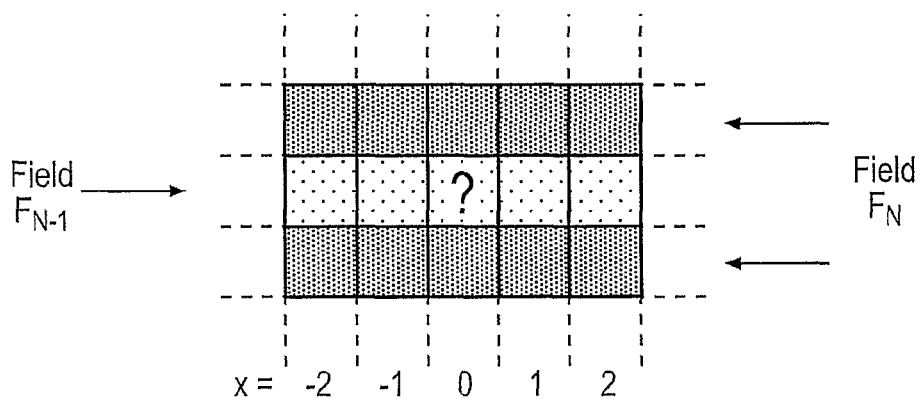
Figure 18:
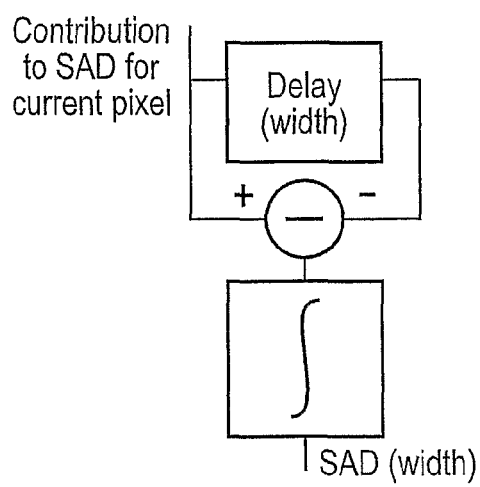
Figures 14A, 14B:
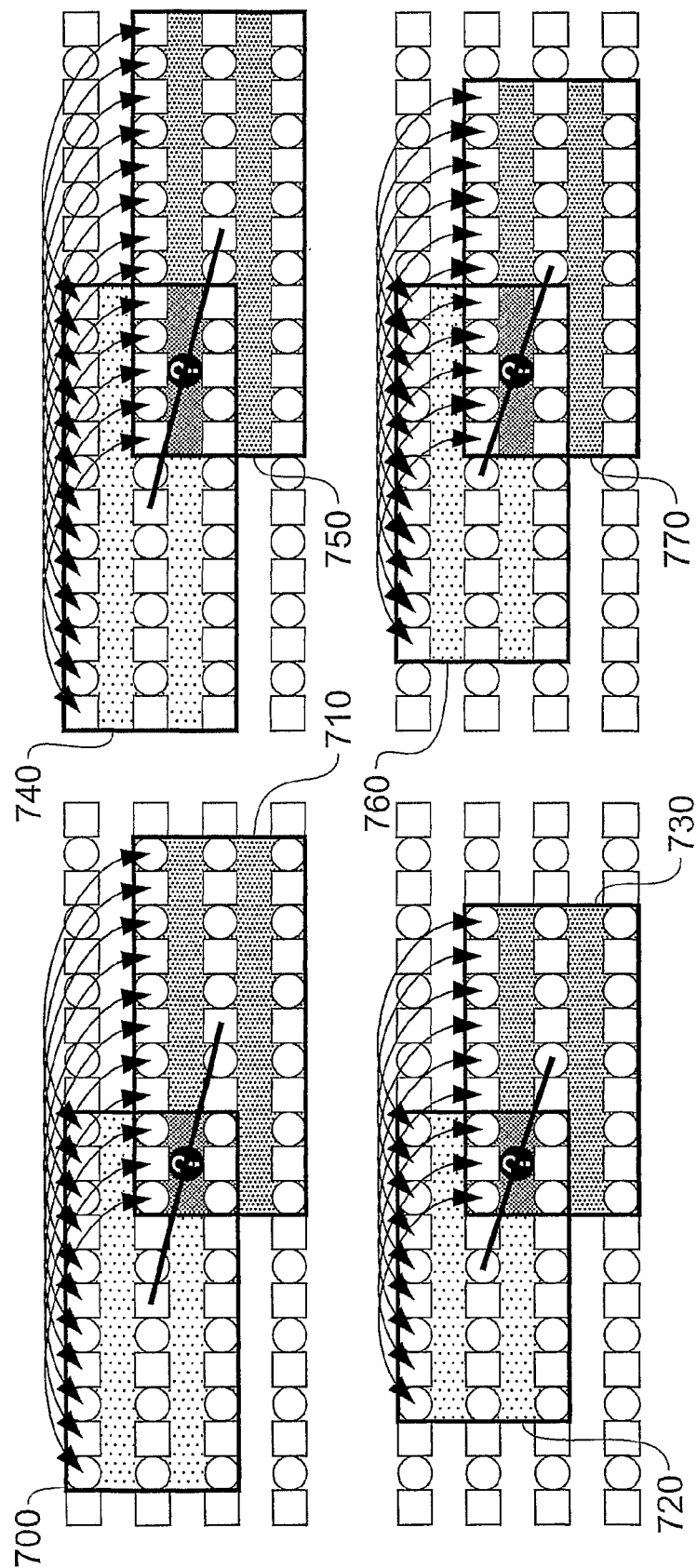
Figure 19:
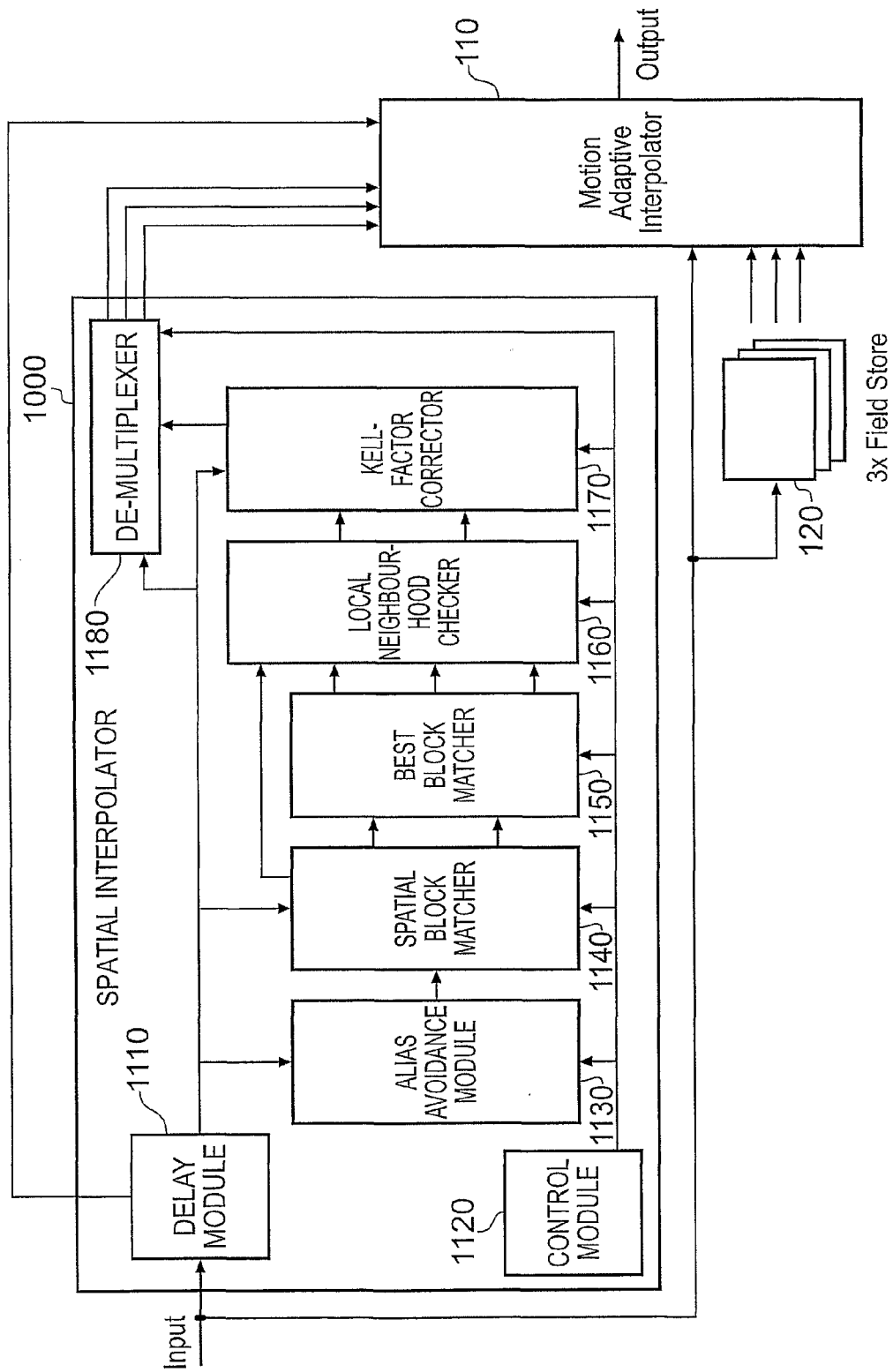
Figure 21A:
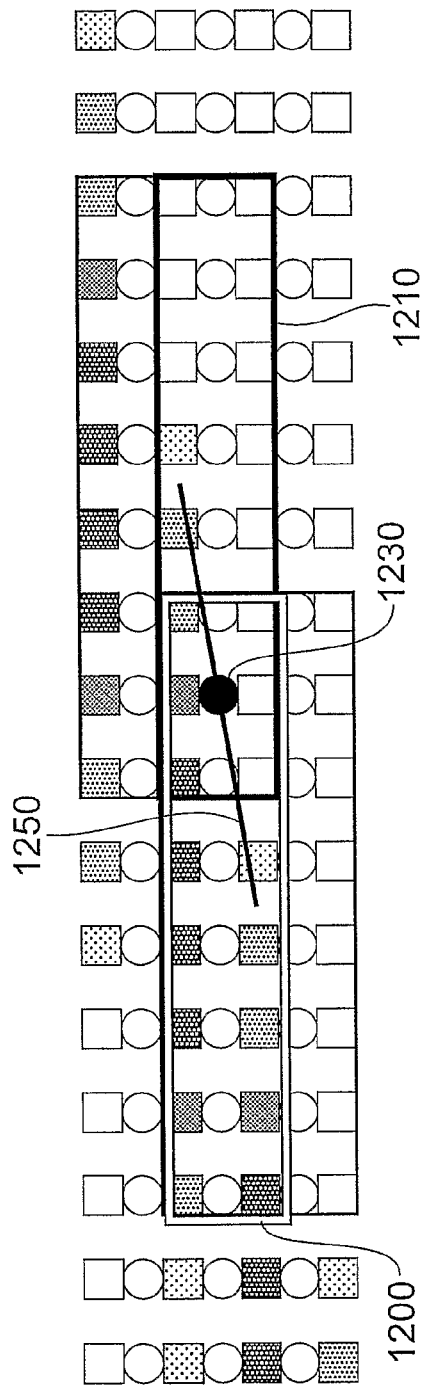
Figure 21B:
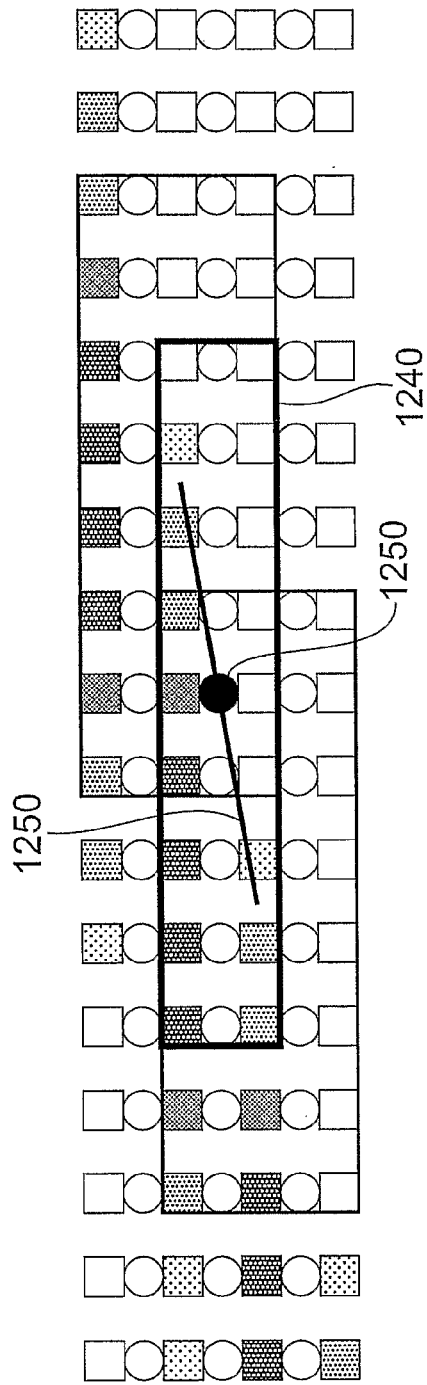

Embodiments of the invention will now be described, by way of example only, with reference to the accompanying drawings in which:

FIG. 1 schematically illustrates a flat-screen display arrangement;

FIG. 2 schematically illustrates video mixing operation in a studio environment;

FIG. 3 schematically illustrates an interlace to progressive converter;

FIGS. 4a to 4c schematically illustrate gradient detection;

FIGS. 5 and 6a to 6e schematically illustrate a spatial block matching operation;

FIGS. 7a and 7b schematically illustrate an alias situation;

FIGS. 8a to 8d schematically illustrate alias detection techniques;

FIG. 9 schematically illustrates a Kell-factor filtering operation;

FIGS. 10 and 11 schematically illustrate stages in a Kell-factor filtering operation;

FIG. 12a schematically illustrates a motion adaptive interpolator;

FIG. 12b schematically illustrates motion detection between successive video fields;

FIG. 13 schematically illustrates a high frequency check operation;

FIGS. 14a and 14b schematically illustrates a variation which reduces the need for image scaling;

FIGS. 15, 16a, 16b, 17a and 17b schematically illustrate a primary and an alternative pixel testing strategy;

FIG. 18 schematically illustrates the generation of a difference value;

FIG. 19 schematically illustrates an alternative embodiment of the interlace to progressive converter;

FIGS. 20a, 20b, 22a and 22b schematically illustrate variations of the alias detection techniques of FIGS. 8a to 8d;

FIGS. 21a and 21b schematically illustrate an example of alias detection techniques applied to a thin line; and FIG. 23 schematically illustrates a Kell-factor filtering operation applied in the horizontal direction.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays (or, indeed, any progressive scan display) operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

FIG. 2 schematically illustrates a video mixing operation in a studio environment, in order to give another example of the use of interlace to progressive scan conversion. Here, a source of interlace material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

FIG. 3 schematically shows an interlace to progressive scan converter. In general terms, the converter comprises a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be described.

The spatial interpolator comprises a 1-2 horizontal pixel scaler 130, a spatial block matcher 140, a minimum error selector 150, a diagonal interpolator 160, a dot noise reducer 170 and a Kell-factor corrector 180. The operation of each of these will be described in more detail below.

The scaler 130 uses horizontal linear interpolation to generate one additional pixel value between each two pixels of the input interlaced field. So, the horizontal resolution (at least in terms of number of available pixel values) is doubled, but no difference is made at this stage to the vertical resolution.

The reason why horizontal scaling is appropriate will be described with reference to FIGS. 4A to 4C.

As will be described below, the overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 450 direction. This can tend to give a better output result than restricting the interpolation to horizontal or vertical interpolation. A key part of this process, clearly, is therefore to detect the direction of an image feature at each pixel position.

This detection is carried out using a block matching process. The actual block matching process will be described in much more detail below. But at this stage, FIG. 4A schematically illustrates a successful block match between two blocks 200, 210 of pixels around the position of an unknown pixel 220 (a circle with a question mark inside). Indeed, the notation used in the present drawings is that a square indicates a known pixel where as a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of 1/2.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than 1/2), it is necessary to operate at a sub-pixel accuracy. In the present case, a half-pixel accuracy was adopted. If a greater accuracy still was used, (e.g. quarter-pixel accuracy) then gradients yet closer to vertical could be detected. In this embodiment, half-pixel accuracy was selected as a balance between processing requirements and accuracy at very acute gradients.

In fact, in embodiments of the invention to be described below, not all of the image is subjected to 1:2 scaling by the scaler 130 at any one stage. This selective use of scaling will be described in more detail below.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation (even though the interpolated pixels are not always used in the processing), example block sizes and search ranges are given in the following table:

| Block Size (in scaled pixels) | Search Range (in scaled pixels) |
|---|---|
| 3v × 5h | 0h |
| 3v × 5h | ±1h |
| 3v × 7h | ±2h |
| ... | ... |
| 3v × 41h | ±19h |

FIG. 5 schematically illustrates a block match operation between two blocks of 3 v×13 h pixels 300, 310, around an unknown pixel position 320. Note that the block width is 13 h in terms of scaled (interpolated) pixels; only the real (source) pixels are shown here. The variable d (in fact a displacement of 4 interpolated pixels) signifies a horizontal displacement of the block's horizontal centre from the pixel position under test. A condition applied to the block matches is that the blocks must always overlap the pixel position under test. Also, the blocks are shown displaced in integral numbers of real pixel displacements (so a displacement of m corresponds to a displacement of 2 m interpolated pixels).

Accordingly, the particular block size shown in FIG. 5 allows five possible tests at a displacement of −4 pixels (FIG.

6A) −3 pixels, −2 pixels (FIG. 6B), −1 pixel, 0 pixels (FIG. 6C), +1 pixel, +2 pixels (FIG. 6D), +3 pixels and +4 pixels (FIG. 6E).

Note that the displacement is indicated as a displacement from the centre, in scaled pixels. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) =$$
$$\sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the radius of the block (the block width is n'=2 n+1).

In general terms, the SAD values for three colour components (red, green and blue) are combined, and a minimum normalised SAD value determines a gradient for interpolation. Various checks are made to avoid poor interpolation, as described below.

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left) is valid, a processing rule has been set up to allow an appropriate selection to be made. This rule will now be described.

The basis of the rule is that the block match process is restricted so that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these tests are applied will be described with reference to FIGS. 8A to 8D.

Figure 8A:
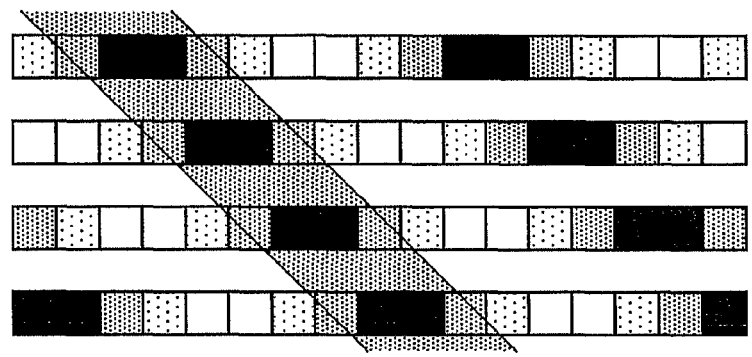
Figure 8B:
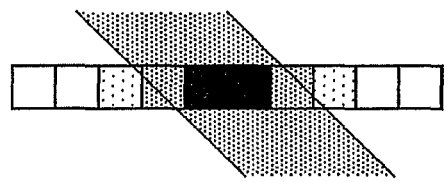
Figure 8C:
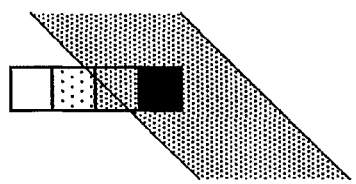
Figure 8D:
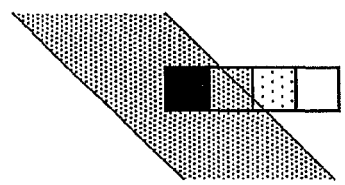

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

In fact, the rule is not expressed in such stark terms. The actual rule involves a balance between the various properties of the line as follows:

$$Monotonicity = \sum_{y=-1}^{0} \left( \left\{ \sum_{i=2}^{blockWidth} |x(i, y) - x(i-1, y)| \right\} - |x(blockWidth, y) - x(1, y)| \right)$$

$$Average\ Vertical\ Energy = \left( \sum_{i=1}^{blockWidth} |x(i, 0) - x(i, -1)| \right) / blockWidth$$

The rule is that:

Monotonicity+C1+(C2/blockwidth)<Average vertical energy where C1, C2 are constants which allow for noise in the data. If this condition is met, the relevant block match is used as a valid interpolation direction.

Note that the tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

A second rule, hinted at above, which is applied to block matching is that the minimum normalised SAD value determines the gradient for subsequent interpolation.

Normally, the direction is selected from the block match with the smallest error (smallest normalised SAD). In such cases, the Kell-factor correction of the corrector 180 will not later be used if the normalised SAD is less than a threshold $KFC_{thresh}$.

However, if the normalised SAD value is similar (within a threshold amount) for multiple block offsets or if the smallest normalised SAD value obtained across all of the block matches is greater than a predetermined maximum value, then vertical interpolation will be used, Kell-factor correction will always be used in these cases and the normalised SAD value is set to the predetermined maximum value mentioned above.

A third rule applicable to block matching is as follows.

The basis of the rule is that neighbouring 'unknown' (to be interpolated) pixels should indicate a similar gradient to a current pixel under consideration.

For the current 'unknown' pixel, let G be the predicted gradient. Let the search range be |G|/4+1 (the division is necessary since 'G' is in terms of scaled pixels). Let C3 ... be programmable constants To apply the rule, examine all pixels in the current missing line at positions from −search range to +search range (inclusive) relative to the current pixel. Each predicted gradient, g, in that range that satisfies the following inequality increments a value 'counter':

(|G|−d)<−C3(g−G)<=(|G|+d)

Then, if counter*C4<C5*(2×range+1), let v be the original value and v' be the vertically interpolated value, and set the result to C6 v'+(1−C6)v (preferred version) or C6 v'+C7 v (more general version), Increment the normalised SAD score for the pixel by C8, which constant can be set to encourage the use of the KFC.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of the four vertically and horizontally pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then;

Let v be the original value of the pixel under consideration, and let v' be v, clipped to lie within the range of the four locally neighbouring pixels.

Let the new pixel value be kDNR v'+(1−kDNR)v, where KDNR is programmable.

The operation of the Kell-factor corrector 180 will now be described with reference to FIGS. 9 to 11.

Kell-Factor Correction

In the present discussion, references to the Kell-factor are simply to help explain the operation of this part of the system. What the filter is actually exploiting is simply the knowledge that the source image did not use the full bandwidth available to it, whether that is because of scanning artefacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

A generic Kell-factor filtering operation is schematically illustrated in FIG. 9, whereby source data is filtered (in the present example, in the vertical direction) to a bandwidth of about 70% of fs/2, i.e. the Nyquist frequency.

The following mathematics and algorithm describe a filter suitable for performing a 70% bandwidth filter on interpolated lines. In empirical tests the filter has been found to significantly reduce artefacts, and it is important to note that the results are also significantly better than simply performing a 1:2 vertical up-scaling operation on the input interlaced video.

FIGS. 10 and 11 schematically demonstrate the concept. The general idea is shown in FIG. 10, whereby a vertical filter is (selectively) applied to real pixels I and interpolated pixels S in a progressive scan frame.

To explain the technique it will be useful to consider some data which does not exist—in particular, the missing lines of an interlaced field. By treating these lines (for part of the derivation) as though they do exist, filter techniques can be derived to apply to the interpolated versions of those lines so as to generate an approximation to a filtered version of the missing lines. This will become clear from the following explanation.

Referring to FIG. 11, a hypothetical 100% vertical bandwidth progressive image 500 is considered. This does not of course exist; at best it would be 70% filtered, due to the inherent filtering in the sampling process. This forms a realisable progressive frame 510. However, even this frame is not available to us; instead, it is provided in interlaced form as a field 520. The field 520 is the source data to the present interlace to progressive scan conversion process.

The interlaced field 520 is supplied to an interlace-to-progressive converter, which then generates the missing field lines to produce a reconstructed frame 530. However, the frame 530 may now contain frequencies that are above 70% of the available bandwidth. Generating such frequencies is not always desired, since the information was not present in the source data to the interlace to progressive scan converter. Hence a version 540 of this frame that does not exceed this bandwidth limit should be created, and this should be achieved by adjusting just the reconstructed field lines and not the source field lines—those source field lines are from an image that has already been passed through such a filter, and are therefore 'perfect'.

Producing the required output can therefore be thought of as the low-pass filter output of a theoretical image 550 constructed from the lines from the original 100% vertical bandwidth image interlaced with the reconstructed field. However, the original 100% vertical bandwidth image is not available, and so a technique to circumvent this problem is now described.

A 3-Tap Source Filter Method

This is the first of the three methods to create a suitable filter; only the latter two methods are recommended, and this method is included in the present description to show progression.

Consider a 3 tap low-pass symmetrical filter of the form $$\text{filter} = \begin{bmatrix} a \\ b \\ a \end{bmatrix}$$

and also a column of pixels, P, from five lines of video that has been converted from interlace to progressive scan:

$$\text{input} = \begin{bmatrix} P_{-2} \\ P_{-1} \\ P_0 \\ P_1 \\ P_2 \end{bmatrix} = \begin{bmatrix} I_{-2} \\ F_{-1} \\ I_0 \\ F_1 \\ I_2 \end{bmatrix}$$

where F are pixels from a real field of data, and I are interpolated pixels. Note that these values are known.

The real field pixels, F, must be output from the system. These have already been filtered according to the Kell-factor during the recording of the video. Hence consider the raw video prior to the filtering—this is a conceptual video source, since the actual Kell-factor filter would be intrinsic in the sampling of the optical information. Let this raw, or pseudo input video be described as:

$$pseudoInput = \begin{bmatrix} I_{-2} \\ x_{-1} \\ I_0 \\ x_1 \\ I_2 \end{bmatrix}$$

where x are unknown values from the conceptual 100% vertical bandwidth source, and the I are pixels that have been spatially interpolated, and output=pseudoInput*filter Let us now consider output pixel, $y_0$, which is vertically aligned with pseudo input pixel $I_0$.

$$\begin{bmatrix} \vdots \\ I_{-2} \\ x_{-1} \\ y_0 \\ x_1 \\ I_2 \\ \vdots \end{bmatrix} = \begin{bmatrix} \vdots \\ I_{-2} \\ x_{-1} \\ I_0 \\ x_1 \\ I_2 \\ \vdots \end{bmatrix} * \begin{bmatrix} a \\ b \\ a \end{bmatrix} = \begin{bmatrix} \vdots \\ ax_{-3} + bI_{-2} + ax_{-1} \\ aI_{-2} + bx_{-1} + aI_0 \\ ax_{-1} + bI_0 + ax_1 \\ aI_0 + bx_1 + aI_2 \\ ax_1 + bI_2 + ax_3 \\ \vdots \end{bmatrix}$$

We do not know the value of $x_{-1}$ and $x_1$, and thus the value of the output pixel, $y_0$, is not immediately known. However, we know that $y_{-1}=F_{-1}$ and $y_1=F_1$, since the output field lines for the current field are known.

Thus $x_{-1}$ and $x_1$ can be found, and subsequently so can $y_0$:

$$x_{-1} = \frac{1}{b}(y_{-1} - a(I_{-2} + I_0)) = \frac{1}{b}(F_{-1} - a(I_{-2} + I_0))$$

$$x_1 = \frac{1}{b}(y_1 - a(I_0 + I_2)) = \frac{1}{b}(F_1 - a(I_0 + I_2))$$

$$y_0 = a(x_{-1} + x_1) + bI_0$$

$$y_0 = \begin{bmatrix} -a^2/b \\ a/b \\ b - 2a^2/b \\ a/b \\ -a^2/b \end{bmatrix} \cdot \begin{bmatrix} I_{-2} \\ F_{-1} \\ I_0 \\ F_1 \\ I_2 \end{bmatrix} = \begin{bmatrix} -a^2/b \\ a/b \\ b - 2a^2/b \\ a/b \\ -a^2/b \end{bmatrix} \cdot \begin{bmatrix} P_{-2} \\ P_{-1} \\ P_0 \\ P_1 \\ P_2 \end{bmatrix}$$

Now, a suitable 70% vertical bandwidth filter is given by the vector:

$$vFilter3Tap70pcnt = \frac{1}{32768} \begin{bmatrix} 5138 \\ 22492 \\ 5138 \end{bmatrix}$$

Hence a=5138 and b=22492. Thus:

$$y_0 = \begin{cases} \begin{bmatrix} P_{-2} \\ P_{-1} \\ P_0 \\ P_1 \\ P_2 \end{bmatrix} * \begin{bmatrix} -1174 \\ 7485 \\ 20145 \\ 7485 \\ -1174 \end{bmatrix} & \text{for } P_0 \text{ aligned to interpolated lines} \\ P_0 & \text{otherwise} \end{cases}$$

Hence the problem is actually solved using a 5-tap filter.

A 5-Tap Source Filter Method

The initial symmetrical 3-tap filter has relatively poor filtering characteristics, and thus a method to improve upon this by using an initial symmetrical 5-tap filter was developed.

However, this method also requires the use of the 3-tap filter, otherwise the problem does not have a solution.

Let the symmetrical 5 tap filter consist of three coefficients: a, b, c, and the full filter be described by $[a, b, c, b, a]^T$.

Similarly, let the 3 tap filter consist of two coefficients: d, e, and the full filter be described by $[d, e, d]^T$.

From before, but extending to use the 5-tap filter, $$\begin{bmatrix} \vdots \\ I_{-2} \\ x_{-1} \\ y_0 \\ x_1 \\ I_2 \\ \vdots \end{bmatrix} = \begin{bmatrix} \vdots \\ I_{-2} \\ x_{-1} \\ I_0 \\ x_1 \\ I_2 \\ \vdots \end{bmatrix} * \begin{bmatrix} a \\ b \\ a \end{bmatrix} = \begin{bmatrix} \vdots \\ aI_{-4} + bx_{-3} + cI_{-2} + dx_{-1} + eI_0 \\ ax_{-3} + bI_{-2} + cx_{-1} + dI_0 + ex_1 \\ aI_{-2} + bx_{-1} + cI_0 + dx_1 + eI_2 \\ ax_{-1} + bI_0 + cx_1 + dI_2 + ex_3 \\ aI_0 + bx_1 + cI_2 + dx_3 + eI_4 \\ \vdots \end{bmatrix}$$

If we attempt to solve this using the same method as before, the problem requires solving a set of simultaneous equations with as many unknowns as half the height of the image. This would thus not be suitable for a sensible hardware design.

Instead, considering the predicted form of the filter, it is likely that the results from the more distant neighbours have a reduced effect on the output than the immediate neighbours of $y_0$: standard low-pass filters have this form of heavy weighting around the central tap. Therefore, when considering a pixel $y_0$, the result from the central tap and the immediate neighbours can be considered to be formed from a 5-tap filter, and the more distant results from a 3-tap filter. Hence the following equation:

$$\begin{bmatrix} \vdots \\ y_{-1} \\ y_0 \\ y_1 \\ \vdots \end{bmatrix} = \begin{bmatrix} \vdots \\ F_{-1} \\ y_0 \\ F_1 \\ \vdots \end{bmatrix} = \begin{bmatrix} \vdots \\ dI_{-2} + ex_{-1} + dI_0 \\ aI_{-2} + bx_{-1} + cI_0 + bx_1 + aI_2 \\ dI_0 + ex_1 + dI_2 \\ \vdots \end{bmatrix}$$

We can now solve for $y_0$, eliminating the unknown 'x's:

$$x_{-1} = \frac{F_{-1} - dI_{-2} - dI_0}{e}$$

$$x_1 = \frac{F_1 - dI_0 - dI_2}{e}$$

-continued $$y_0 = aI_{-2} + bx_{-1} + cI_0 + bx_1 + aI_2$$
$$= \left(a - \frac{bd}{e}\right)I_{-2} + \frac{b}{e}F_{-1} + \left(c - 2\frac{bd}{e}\right)I_0 + \frac{b}{e}F_1 + \left(a - \frac{bd}{e}\right)I_2$$

An example 70% 5 tap filter is:

$$vFilter5Tap70pcnt = \frac{1}{32768}\begin{bmatrix} -4006 \\ 8486 \\ 23808 \\ 8486 \\ -4006 \end{bmatrix} = \begin{bmatrix} a \\ b \\ c \\ b \\ a \end{bmatrix}$$

The example 3-tap filter defined above is:

$$vFilter3Tap70pcnt = \frac{1}{32768}\begin{bmatrix} 5138 \\ 22492 \\ 5138 \end{bmatrix} = \begin{bmatrix} d \\ e \\ d \end{bmatrix}$$

Hence the output pixel $y_0$ can be calculated using the following matrix:

$$y_0 = \frac{1}{32768}\begin{bmatrix} I_{-2} \\ F_{-1} \\ I_0 \\ F_1 \\ I_2 \end{bmatrix} \cdot \begin{bmatrix} -5945 \\ 12363 \\ 19930+2 \\ 12363 \\ -5945 \end{bmatrix}$$

where the +2 is used to ensure there is unity DC gain (this is required due to rounding errors).

A 7-Tap Source Filter Method

Similar to the 5-tap method, the 7-tap method requires the use of a 7-tap filter, a 5-tap filter and a 3-tap filter.

Let the symmetrical 7 tap filter consist of four coefficients: a, b, c, d, and the full filter be described by $[a, b, c, d, c, b, a]^T$.

Similarly, let the 5 tap filter consist of three coefficients: e, f, g, and the full filter be described by $[e, f, g, f, e]^T$.

Finally, let the 3 tap filter consist of two coefficients j, k, and the full filter by described by $[i, k, j]^T$.

Let us now consider the output pixel $y_0$, and its neighbours:

$$\begin{bmatrix} \vdots \\ y_0 \\ \vdots \end{bmatrix} = \begin{bmatrix} aI_{-6} + bx_{-5} + cI_{-4} + dx_{-3} + cI_{-2} + bx_{-1} + aI_0 \\ ax_{-5} + bI_{-4} + cx_{-3} + dI_{-2} + cx_{-1} + bI_0 + ax_1 \\ aI_{-4} + bx_{-3} + cI_{-2} + dx_{-1} + cI_0 + bx_1 + aI_2 \\ ax_{-3} + bI_{-2} + cx_{-1} + dI_0 + cx_1 + bI_2 + ax_3 \\ aI_{-2} + bx_{-1} + cI_0 + dx_1 + cI_2 + bx_3 + aI_4 \\ ax_{-1} + bI_0 + cx_1 + dI_2 + cx_3 + bI_4 + ax_5 \\ aI_0 + bx_1 + cI_2 + dx_3 + cI_4 + bx_5 + aI_6 \\ \vdots \end{bmatrix}$$

Again, this is not practical to solve, and thus we shall solve this using a combination of a 7-tap, 5-tap and 3-tap filter:

$$\begin{bmatrix} \vdots \\ y_{-3} \\ y_{-2} \\ y_{-1} \\ y_0 \\ y_1 \\ y_2 \\ y_3 \\ \vdots \end{bmatrix} = \begin{bmatrix} \vdots \\ F_{-3} \\ y_{-2} \\ F_{-1} \\ y_0 \\ F_1 \\ y_2 \\ F_3 \\ \vdots \end{bmatrix} = \begin{bmatrix} 0 \\ jI_{-4} + kx_{-3} + jI_{-2} \\ eI_{-4} + fx_{-3} + gI_{-2} + fx_{-1} + eI_0 \\ aI_{-4} + bx_{-3} + cI_{-2} + dx_{-1} + cI_0 + bx_1 + aI_2 \\ ax_{-3} + bI_{-2} + cx_{-1} + dI_0 + cx_1 + bI_2 + ax_3 \\ aI_{-2} + bx_{-1} + cI_0 + dx_1 + cI_2 + bx_3 + aI_4 \\ eI_0 + fx_1 + gI_2 + fx_3 + eI_4 \\ jI_2 + kx_3 + jI_4 \\ 0 \end{bmatrix}$$

This equation can be solved:

$$x_{-3} = \frac{F_{-3} - j(I_{-4} + I_{-2})}{k}$$

$$x_3 = \frac{F_{-3} - j(I_2 + I_4)}{k}$$

$$F_{-1} + F_1 = \left\{ \begin{array}{l} b(x_{-3} + x_3) + (b+d)(x_{-1} + x_1) + \\ a(I_{-4} + I_4) + (a+c)(I_{-2} + I_2) + 2cI_0 \end{array} \right\}$$

$$= \left\{ \begin{array}{l} \frac{b}{k}(F_{-3} + F_{-3} - j(I_{-4} + I_{-2} + I_2 + I_4)) + \\ (b+d)(x_{-1} + x_1) + a(I_{-4} + I_4) + \\ (a+c)(I_{-2} + I_2) + 2cI_0 \end{array} \right\}$$

$$\Rightarrow (x_{-1} + x_1) = \frac{1}{b+d}\left\{ \begin{array}{l} F_{-1} + F_1 - \frac{b}{k}(F_{-3} + F_3 - \\ j(I_{-4} + I_{-2} + I_2 + I_4)) - a(I_{-4} + I_4) - \\ (c+a)(I_{-2} + I_2) - 2cI_0 \end{array} \right\}$$

$$y_0 = a(x_{-3} + x_3) + b(I_{-2} + I_2) + c(x_{-1} + x_1) + dI_0$$

$$= \left\{ \begin{array}{l} \frac{a}{k}(F_{-3} + F_3 - j(I_{-4} + I_{-2} + I_2 + I_4)) + \\ b(I_{-2} + I_2) + dI_0 \\ \frac{c}{b+d}\left\{ \begin{array}{l} F_{-1} + F_1 - \frac{b}{k}(F_{-3} + F_3 - j(I_{-4} + \\ I_{-2} + I_2 + I_4)) - a(I_{-4} + I_4) - \\ (c+a)(I_{-2} + I_2) - 2cI_0 \end{array} \right\} \end{array} \right\}$$

$$= \frac{1}{(b+d)k}\begin{bmatrix} I_{-4} \\ F_{-3} \\ I_{-2} \\ F_{-1} \\ I_0 \\ F_1 \\ I_2 \\ F_3 \\ I_4 \end{bmatrix} \cdot \begin{bmatrix} cbj - ack - aj(b+d) \\ a(b+d) - cb \\ (bk - aj)(b+d) + cbj - ack - c^2k \\ ck \\ d(b+d)k - 2kc^2 \\ ck \\ (bk - aj)(b+d) + cbj - ack - c^2k \\ a(b+d) - cb \\ cbj - ack - aj(b+d) \end{bmatrix}$$

An example 70% 7-tap filter is:

$$vFilter7Tap70pcnt = \frac{1}{32768}\begin{bmatrix} -3766 \\ -8514 \\ 12315 \\ 32698 \\ 12315 \\ -8514 \\ -3766 \end{bmatrix} = \begin{bmatrix} a \\ b \\ c \\ d \\ c \\ b \\ a \end{bmatrix}$$

The example 5-tap filter defined above is:

$$vFilter5Tap70pcnt = \frac{1}{32768}\begin{bmatrix} -4006 \\ 8486 \\ 23808 \\ 8486 \\ -4006 \end{bmatrix} = \begin{bmatrix} e \\ f \\ g \\ f \\ e \end{bmatrix}$$

The example 3-tap filter defined above is:

$$vFilter3Tap70pcnt = \frac{1}{32768}\begin{bmatrix} 5138 \\ 22492 \\ 5138 \end{bmatrix} = \begin{bmatrix} j \\ k \\ j \end{bmatrix}$$

Hence the output pixel $y_0$ can be calculated using the following matrix:

$$y_0 = \frac{1}{32768}\begin{bmatrix} I_{-4} \\ F_{-3} \\ I_{-2} \\ F_{-1} \\ I_0 \\ F_1 \\ I_2 \\ F_3 \\ I_4 \end{bmatrix} \cdot \begin{bmatrix} 1787 \\ 830 \\ -12997 \\ 16686 \\ 20156 \\ 16686 \\ -12997 \\ 830 \\ 1787 \end{bmatrix}$$

This equation is used on each spatially interpolated pixel. The response is a bandstop filter, with the stop band between 0.66 and 0.8 $f_s/2$; however, interpreting the response is complicated as it is only used for alternate output pixels.

FIG. 12a schematically illustrates the operation of the motion adaptive interpolator 110. The interpolator 110 comprises and inter-field block matcher 600, a high frequency checker 610 and a mixer 620.

The inter-field block matcher 600 uses data from the current input field and the three field stores 120 to carry out inter-field motion comparisons. This involves comparing blocks of pixels in the current field ($F_N$ in FIG. 12b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two weighted SADs. These are:

5 h×4 v weighted block match on fields $F_N$ and $F_{N-2}$.
a 5 h×3 v weighted block match on fields $F_{N-1}$ and $F_{N-3}$.
a 1 h×1 v weighted block match on fields $F_{N-1}$ and $F_{N-3}$.
a 1 h×2 v weighted block match on fields $F_N$ and $F_{N-2}$.

Weighted block matches sum weighted absolute differences between coincident pixels, SWAD.

$$SWAD = \sum_{dx=-2}^{2} \sum_{dy=-2,0,2} \sum_{RGB/YCbCr} w(dx, dy)|F_{N-1}(dx, dy) - F_{N-3}(dx, dy)|$$

where $F_{N-1}(dx,dy)$ is the value at the frame-relative position dx, dy to the current pixel. Example values of w can be found in the Appendix.

Summing the first two SWADs gives an area-based block match, $SWAD_{AREA}$

Summing the latter two SWADs gives a localised block match, $SWAD_{LOCAL}$

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

The high frequency checker 610 is arranged to detect high frequencies in the input fields. The algorithm is based on the following principle.

If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Referring to FIG. 13, the high frequency checker uses the lines above and below the currently interpolated pixel from the current field $F_N$ and the line from the preceding field $F_{N-1}$ that corresponds to the missing line. The HFC may be considered as a 5×3 pixel neighbourhood check.

Let $HFC_{thresh1}$ and $HFC_{thresh2}$ be two programmable constants, with the former greater than the latter.

Set a flag: exceededHighEnergy=false

Over Each Component (or a Subset of them)—

(RGB/YPbPr) where YPbPr indicate the colour space in a high definition system, in a similar way to YCbCr in a standard definition system:

Set energy=0

For the pixels having a horizontal position x=−2,−1, 0, 1, 2 (relative to the current pixel), let the interleaved field value be $v_0$, and the current field value of the line above and below be $v_{-1}$ and $v_1$, then:

if $v_0$<min($v_1,v_{-1}$), set diff=min(v1,v−1)−v0 else if v0>max(v1,v−1), set diff=v0−max(v1,v−1)

else set diff=0

If (diff>$HFC_{thresh1}$), set energy=energy+($HFC_{thresh1}$−$HFC_{thresh2}$)*weighting[x]

else if (diff>$HFC_{thresh2}$), set energy=energy+(diff−$HFC_{thresh2}$)*weighting[x]

If energy>$HFC_{allowance}$, set flag exceededHighEnergy=true

This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_1$ . . . .

If $SWAD_{LOCAL}$>$thresh_1$, use only spatially interpolated field, $F_{N'}$

Else if $SWAD_{AREA}$>$thresh_2$, use only spatially interpolated field, $F_{N'}$, only Else if SWAD$_{AREA}$<thresh$_3$, use only field F$_{N-1}$
Else mix field F$_{N-1}$ and F$_{N'}$:
let a=(thresh$_2$−SWAD$_{AREA}$)/(thresh$_2$−thresh$_3$)
The resulting pixel value=a F$_{N-1}$+(1-a) F$_{N'}$ FIGS. 14*a* and 14*b* schematically illustrates a variation which reduces the need for image scaling. In particular, FIG. 14*a* schematically illustrates the operation of embodiment described above, where each row of pixels (indicated in this diagram as □○□○ . . . contains real pixels and 1:2 interpolated pixels from the scaler 130. An example block match between two blocks 700, 710 and another between two blocks 720, 730 is illustrated.

In common between the two block matches in FIG. 14*a* is the fact that the extreme edge pixels of the blocks are 1:2 interpolated pixels ○. Therefore, this method relies on the whole image having been scaled by the 1:2 scaler.

In FIG. 14*b*, the blocks are changed in size very slightly so that the extreme edge pixels are real rather than interpolated pixels. In the upper part of FIG. 14*b*, the same image feature angle is tested as in the upper part of FIG. 14*a*, but the blocks 740, 750 are made slightly wider so that their edge pixels are real pixels □. Similar considerations apply to the lower part of FIG. 14*b*, which shows a match between blocks 760, 770 which tests the same image feature angle as the match shown in the lower part of FIG. 14*a*.

It is then the case that the comparisons between pairs of interpolated pixels are not actually needed for large blocks such as those shown in FIGS. 14*a* and 14*b*. The same information can be obtained from a basic comparison of the real (non-interpolated) pixels. Recall, however, that the original reason why the pixel interpolation was introduced was to allow for steep (near vertical) image feature angles to be detected. Therefore, in one arrangement, the present embodiment retains the 1:2 interpolation operation for smaller block offsets, in order to allow such steep angles to be better detected. For example, a range of block offsets of ±1 and 0 could use 1:2 interpolated pixels, whereas block offsets of greater than this need not use the 1:2 interpolated pixels.

In a further variation, each block size is used in a match operation for only its most positive and most negative offsets. This can dramatically reduce the number of block matching operations needed, while not actually losing any information, since the previous scheme repeated (for example) the block matching tests at zero displacement (vertical image feature) for each block size.

Taken together, these measures can allow the 1:2 interpolation to be carried out "as required", for example within the block matcher, rather than as a whole field of interpolated pixels by the scaler 130. This reduces the need for a field store to hold the field of interpolated pixels. Instead, just a few interpolated pixels over a few lines need to be buffered by the block matcher.

FIGS. 15, 16*a*, 16*b*, 17*a* and 17*b* schematically illustrate a primary and an alternative pixel testing strategy.

A further alternative to the arrangement described above is another alteration to alter the rules applicable to block matching in order to reduce the hardware requirements of this operation.

The original equation for horizontal energy, described above, was:

$$\left(\sum_{i=2}^{blockWidth} |x_i - x_{i-1}|\right) - |x_{blockWidth} - x_1|$$

where x referred to the centre row of the block. This can be replaced by the equation:

$$\sum_{y=-1}^{0}\left\{\left(\sum_{i=2}^{blockWidth} |x(i, y) - x(i-1, y)|\right) - |x(blockWidth, y) - x(1, y)|\right\}$$

Figure 16A:
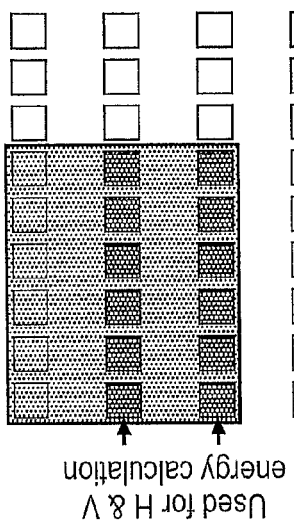
Figure 17A:
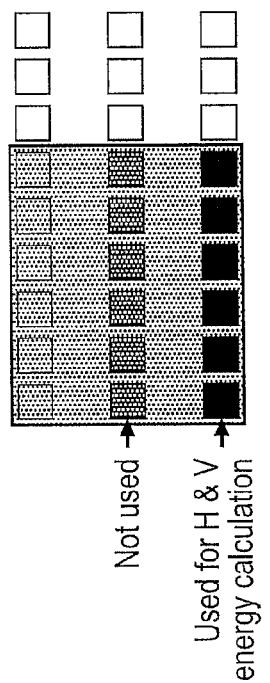
Figure 16B:
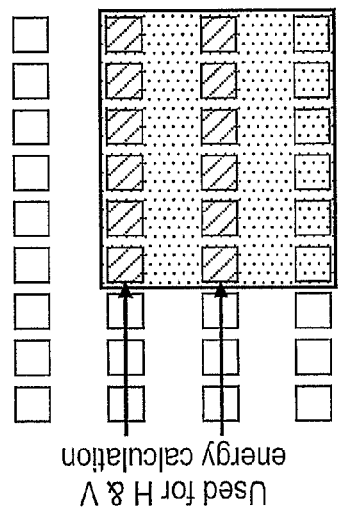
Figure 17B:
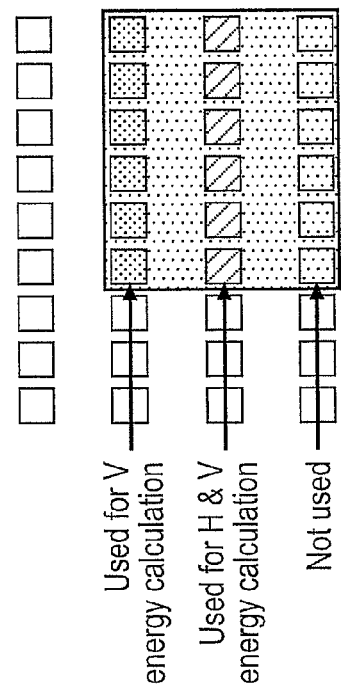
Figure 15:
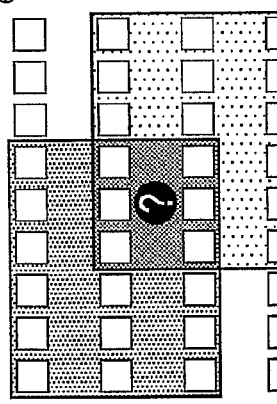

The revised test is symmetrical about the interpolated row. FIG. 15 schematically illustrates a block match. FIGS. 16*a* and 16*b* schematically illustrate the original test for horizontal and vertical energy which would have been performed in respect of that block match. FIGS. 17*a* and 17*b* schematically illustrate the revised tests which show that the same two rows are used for both tests.

This means that the same logic can carry out both tests, leading to a reduction in the hardware required to implement this rule.

FIG. 18 schematically illustrates the generation of a difference value. With the arrangement of FIG. 18, SAD values are calculated as a rolling average, with a new value being inserted and an old one discarded. This again can cut down the processing and hardware required to implement this feature.

An alternative embodiment of an interlace to progressive converter will now be described with reference to FIG. 19. The interlace to progressive converter shown in FIG. 19 chiefly comprises a spatial interpolator 1000, the motion adaptive interpolator 110, and the set of three field stores 120.

The motion adaptive interpolator 110 and the three field stores 120 are substantially the same as those described with reference to FIG. 3. However, the spatial interpolator 1000 is an alternative embodiment to the spatial interpolator 100 that is described with reference to FIG. 3. The spatial interpolator 1000 will now be described.

The spatial interpolator 1000 comprises a delay module 1110, a control module 1120, an alias avoidance module 1130, a spatial block matcher 1140, a best block matcher 1150, a local neighbourhood checker 1160, a Kell-factor corrector 1170 and a de-multiplexer 1180. Some of these operate in a similar manner to corresponding features already described. Where there are differences, the operation and effect of each of these differences will be described in more detail below.

The delay module 1110 is operable to receive video input data and preferably comprises three line delays and pixel delays for providing data to the alias avoidance module 1130, the spatial block matcher 1140, the Kell-factor corrector 1170 and the de-multiplexer 1180. Alternatively, the pixel delays may be implemented separately in other modules. The delay module 1110 is also able to output data to the motion adaptive interpolator 110. In this case, extra pixel delays may be included in the data output to the motion adaptive interpolator so that the data is aligned with the interpolated outputs of the spatial interpolator. A person skilled in the art will realise that the delay module 1110 may comprise any number of line delays and/or pixel delays.

The control module 1120 generates control signals for the alias avoidance module 1130, spatial block matcher 1140, best block matcher 1150, local neighbourhood checker 1160, Kell-factor corrector 1170 and the de-multiplexer 1180. For example, the control module 1120 is able to output control signals to the local neighbourhood checker 1160 and the de-multiplexer 1180 so as to perform edge processing. Edge processing can be used to address the issue that, at the edges of the input field, there are not enough lines or pixels to enable the full spatial interpolation method to be used. Instead, the pixels at the edges of the input field may be interpolated according to, for example, a line repeat function at one vertical edge and a simple vertical average between vertically adjacent pixels at the other edge. It will be appreciated that any other method for interpolating pixels at the edges of the input field may be used.

The 'line repeat' function and vertical interpolation are used at the edges of the image. This is because it is not possible to perform block matching unless there are two source rows above and below the source line.

At the top of an image, where there is only one line above the current line, vertical interpolation is carried out using the current line and the one line above it. If there is no line above the current line then the current line is repeated.

The same method is used at the bottom of the image, where there are fewer than two lines below the current line.

The algorithm also includes an optional feature, whereby the vertical interpolation (when there is only one line above or below the current line) may be replaced by a block match. This is done by replacing the block match contribution from the 'missing' line with zero values.

This optional feature does not change the case where there is no line above (or below) the current line.

The control module 1120 is also able to generate processing break flags that indicate a boundary, which the spatial interlace-to-progressive processing must not cross. For example, the processing breaks could occur at the start and end of each input line of pixels and the control module 1120 could use this data to indicate to the alias avoidance module 1130 where the processing breaks occur so that anti alias processing (as described above with reference to FIGS. 7a, 7b and 8a to 8d and/or as will be described in more detail below) may be carried out without generating processing errors or artificial image artefacts The processing break signal is used to dis-allow any diagonal detections that involve a block match crossing the processing break pixels. In the embodiment described this is only at the line edges. In another application this could be (for instance) a horizontal wipe effect, where the two sides of the processing break are from different source images.

e.g. Left Hand Side=Source #1
Right Hand Side=Source #2

The alias avoidance module 1130 is operable to carry out anti alias measures as described above with reference to FIGS. 7a, 7b and 8a to 8d so as to avoid problems caused by alias situations. The alias avoidance module 1130 generates and outputs allow flags which indicate if a particular diagonal can be used. The allow flags are passed to the spatial block matcher 1140. The alias avoidance module 1130 is also operable to carry out further processing to reduce the effects of alias situations as will described in more detail below.

The spatial block matcher 1140 is operable to carry out the block matching as described above and is similar in operation to the spatial block matcher 140 described with reference to FIG. 3. The spatial block matcher comprises block match units for carrying out the block matching. The input data for the units is provided by the delay module 1110 and the tests are enabled by the allow flags received from the alias avoidance module. The block match units generate normalised sum-of-absolute difference (NSAD) values as described above as well as generating a spatially interpolated pixel (SIP) for each matched block. These values are passed to the best block matcher 1150. The spatial block matcher 1140 is also operable to generate vertically interpolated pixel values for use when no valid diagonals are identified or for when none of the diagonals that were identified are suitable for the basis on which to interpolate the pixel under test. The vertically interpolated pixel values are passed to the local neighbourhood checker 1160.

The best block matcher 1150 is operable to process the NSAD and SIP values output by the spatial block matcher 1140 to determine which of the blocks identified by the spatial block matcher 1140 should be used as the basis for interpolation. For example, the best block could be identified as the one that has the lowest NSAD value. However, a person skilled in the art will realise that other methods of selecting the best block are possible. The best block matcher 1150 passes the identified best block NSAD value and the SIP to the local neighbourhood checker 1160. The best block matcher 1150 also passes the interpolation direction associated with that identified best block to the local neighbourhood checker 1160.

The local neighbourhood checker 1160 performs a consistency check on the output of the best block matcher 1150 in order to see if the block selected by the best block matcher 1150 is consistent with neighbouring blocks. If the output of the best block matcher 1150 is inconsistent then this output is modified by the local neighbourhood checker.

The Local Neighbourhood Check is given the best direction SIP and the vertically interpolated pixel (VIP). Depending on the test result it outputs either the SIP, the VIP or a mixture of the two. It will of course be appreciated that this functionality could be provided by other units within the embodiment.

One way of describing the gradient of the interpolation direction with respect to the pixel under test is to describe the gradient in terms of a horizontal offset with respect to a pixel a line of adjacent pixels immediately above the pixel under test. Alternatively an adjacent line of pixels immediately below the pixel under test may be used or that, in both cases, a horizontal line of pixels could be vertically displaced by some other value. For example, the pixel under test could be defined as sitting at the origin of an (x, y) plot. The gradient could then be defined by the gradient of a line passing through the origin and through the point (x, 1). However, it will be realised that the axes may be reversed and/or that a positive offset could be defined to the left of the pixel under test or vice versa and that any suitable coordinate system could be used to describe the gradient of the interpolation direction.

For example, in the case described above, a selected gradient of x=−10 as the basis for interpolation is unlikely to be correct if that pixel is surrounded by pixels for which the interpolation direction or gradient is determined to be in the range of a horizontal offset of x=+4 to +6. Any inconsistent directions are removed and replaced. In particular any inconsistent directions are detected, their NSAD values are modified and the vertically interpolated pixel is output. The NSAD values are used in the KFC module (see below). The modified NSAD value is set so that the KFC will be used for this pixel.

The local neighbourhood checker passes the modified NSAD values and interpolated pixel (IP) values to the Kell-factor corrector 1170.

The Kell-factor corrector 1170 receives the NSAD values and the IP values output by the local neighbourhood checker 1160 and is operable to perform Kell-factor correction as described above with reference to FIGS. 9, 10 and 11. The Kell-factor corrector 1170 is also operable to perform additional filtering as will be described in more detail below. The interpolated data that is generated by the Kell-factor corrector is passed to the de-multiplexer 1180.

The de-multiplexer 1180 is operable to route the interpolated data from the Kell-factor corrector to the correct input of the motion adaptive interpolator 110. So as to ensure correct data processing, the de-multiplexer is also operable to generate any data headers or control signals that may have been lost during interlace to progressive processing by the spatial interpolator 1000.

An alternative method of alias avoidance will now be described with reference to FIGS. 20a and 20b. Here, a similar notation is used to that employed previously, except that lines of interpolated pixels (circles) are not shown; only an interpolated pixel under test is shown.

Figure 20A:
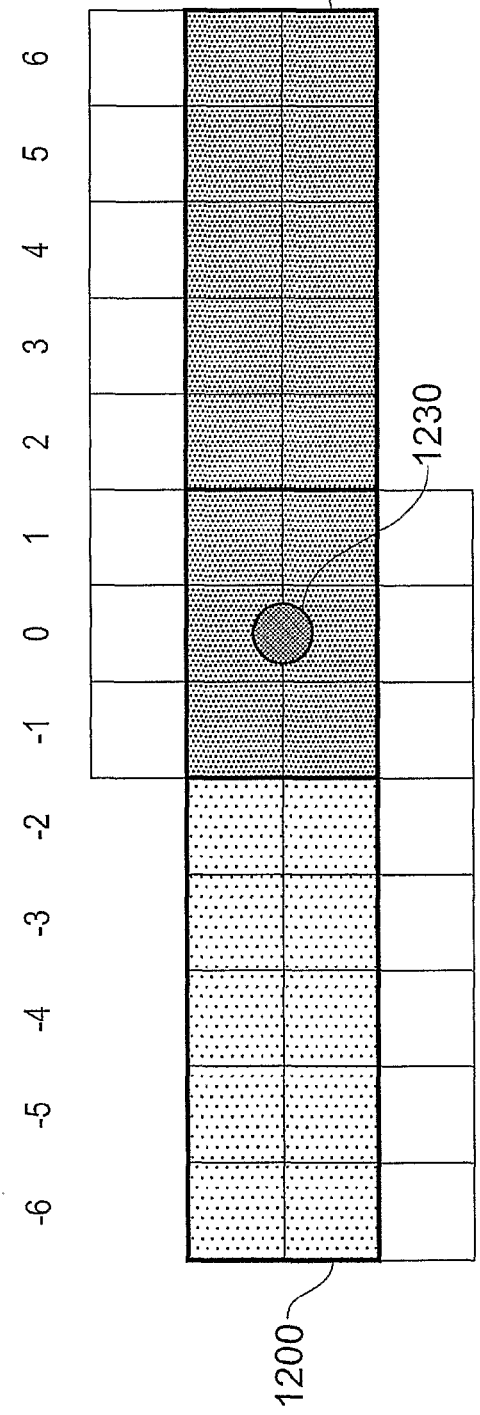

FIG. 20a shows the application of the monotonicity test that was described above with reference to FIGS. 7a, 7b and 8a to 8d. To summarise this method here, the monotonicity test is applied to two blocks 1200 and 1210, indicated by the heavier solid lines in FIG. 20a, that span the block matched regions under test. If both blocks pass the monotonicity test, then the direction indicated by the block match is accepted and the pixel under test 1230 is interpolated accordingly.

Figure 20B:
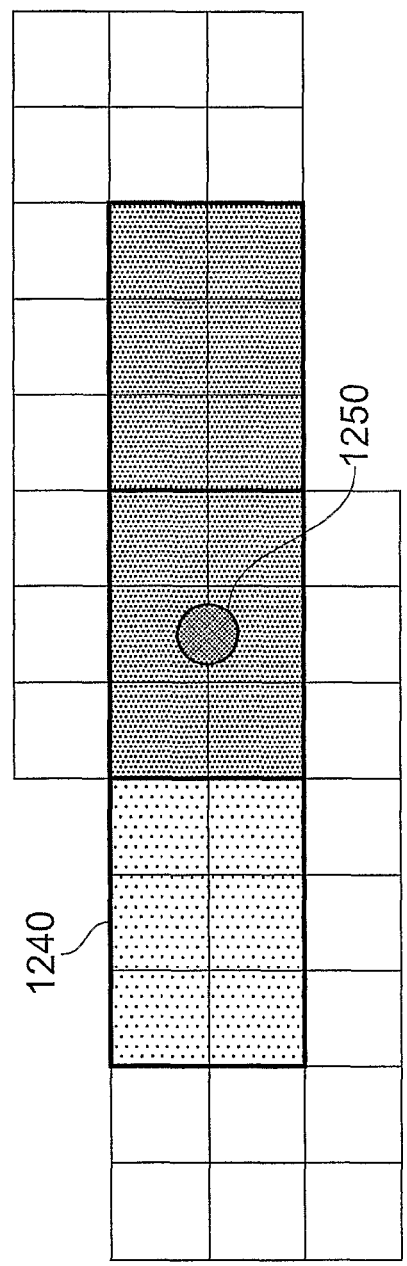

In the alternative embodiment as shown in FIG. 20b, a single block 1240 of a similar size to each of the two blocks (1200, 1210) that are used in the two-block monotonicity test is used to perform the monotonicity test. Preferably, the single block 1240 is centred on the pixel position 1250 under test as shown in FIG. 20b but other configurations of the single test block 1240 with relation to the pixel 1250 under test are possible. This method is advantageous in that it increases the likelihood that low-gradient thin lines are detected as only the area close to the interpolation position is tested and areas that lie further away may be disregarded.

An example of this method is shown in FIGS. 21a and 21b. FIG. 21a shows the two-block method being applied to an image region comprising a thin line. The direction under test is indicated by the solid black line 1250 and the pixel position under test 1230 by the circle with the question mark. In this case, the monotonicity test previously described would reject this direction as the two separate blocks are not monotonic. However, as is shown in FIG. 21b, the test block region 1240 is monotonic and the direction under test 1250 is accepted as the correct direction on which to base the interpolation of the pixel under test 1250. A person skilled in the art will realise that any size block may be used for the monotonicity test and that the outcome of the test and its success at reducing alias effects around low gradient thin lines will depend on the size of the block used.

A further modification to the monotonicity test will now be described with reference to FIGS. 22a and 22b.

As was described above, it is advantageous to use a single test block for performing the monotonicity test. However, a further refinement may be made to this method in order to reduce the effects of aliasing. Once a direction under test 1310 has been accepted, smaller blocks, also centred on the same pixel 1330 under test, may also be tested for monotonicity.

An example of this is shown in FIGS. 22a and 22b. A valid diagonal is detected in respect of the blocks shown in FIG. 22b. A further test is applied in that some or all smaller sets of blocks (such as the set shown in FIG. 22a) must also pass a monotonicity test for that diagonal to be accepted.

In more detail, as shown in FIG. 22a, a valid diagonal 1320 should appear in all of the smaller blocks under test that are centred on that pixel under test 1330. If any of the smaller blocks fail the monotonicity test, then the direction 1310 indicated by the original large test block of FIG. 22b is not accepted as the diagonal on which to base interpolation of the pixel 1330 under test. For example, the test could be applied to blocks of decreasing size from the size of the original test block. Alternatively, the monotonicity test could be applied to the smallest test block possible (3 h×3 v) centred on the pixel 1330 under test and then increased in size up to the size of the original test block.

As described above, the monotonicity may be given by $$\text{monotonicity} = \sum_{y=-1}^{0} \left[ \left\{ \sum_{i=2}^{blockWidth} |x(i, y) - x(i-1, y)| \right\} - |x(blockwidth, y) - x(1, y)| \right] + C$$

with $$\sum_{y=-1}^{0} (|x(blockWidth, y) - x(1, y)|) = \textit{diffextreme}$$

and where:
x is the source pixel value; x(91,0) is the top left pixel of the monotonicity block;
y is the row coordinate; y=0 represents the top row and y=−1 represents the bottom row of the block match block;
blockWidth is the block width in pixels; and
C is a constant which allows for noise in the data.

The above equation describes how pixel-by-pixel differences are summed along each line of pixels in the test block (first term in the summation). The difference, given by diffextreme, between the edge pixels is then subtracted. In this case, a negative value of C is added to the final result to account for noise.

In general, the more negative C becomes the less likely noise is to influence the calculation.

However, if too large a negative value of C is used, there is a risk that the likelihood of selecting unwanted diagonals increases. In order to more efficiently account for noise by using a suitable value of C whilst still having a high probability of selecting the correct diagonal, a threshold may be applied to the individual pixel differences, as described below.

By appropriately scaling the diffextreme value, the value of C may be reduced thus alleviating the risk that unwanted diagonals are selected. A noise threshold may be applied to each pixel by subtracting a threshold value from each pixel-by-pixel difference and then clipping negative pixel-by-pixel difference results to zero as described below.

The noise tolerance of the monotonicity may be based on the feature under test rather than on a global constant. For example, a scaled quantity of diffextreme may be subtracted as shown below.

$$\text{monotonicity} = \sum_{y=-1}^{0} \left\{ \sum_{i=2}^{blockWidth} \max(0; |x(i, y) - x(i-1, y)| - \text{adjustment}) \right\} - \frac{\textit{diffFactor} \cdot \textit{diff}_{extreme}}{16} + C$$

In this example, adjustment defines the pixel-by-pixel threshold and diffFactor is a scaling factor for $\textit{diff}_{extreme}$. In one embodiment, the pixel-by-pixel threshold may depend on the average pixel value as shown below.

adjustment=CONSTANT*(pix(x,y)+pix(x−1,y))/1024

The table below shows example values for where the pixel-by-pixel threshold depends on the average pixel value. The best combination (subjectively evaluated) is shown in the column headed "Best Value".

| Parameter | Values tested | Best Value |
|---|---|---|
| C | −64, −128, −256, −512, −1024 | −256 |
| diffFactor | 16 | 16 |
| Adjustment CONSTANT | 16, 32, 64, 128, 256 | 64 |

Applying the above pixel-by-pixel threshold can improve the appearance or nearly horizontal lines but may introduce artefacts around other image regions.

In an alternative embodiment of altering the noise tolerance, the pixel-by-pixel threshold may be fixed for every block and pixel with adjustment=CONSTANT The table below shows example values for where the pixel-by-pixel threshold is fixed for every block and pixel. The best combination (subjectively evaluated) is shown in the column headed "Best Value".

| Parameter | Values tested | Best Value |
|---|---|---|
| C | −256, −512, −1024 | −512 |
| diffFactor | 16, 32, 48 | 32 |
| Adjustment CONSTANT | 8, 16, 32 | 16 |

The pixel-by-pixel threshold can improve the appearance of low angle parallel lines as well as improving the appearance of image regions where there are many possible diagonals. Although particular embodiments of the monotonicity test have been described above, a person skilled in the art will realise that any or all of these tests may be combined.

The operation of the Kell-factor corrector 1170 will now be described in more detail.

As was described above, the Kell-factor corrector 1170 is operable to selectively apply Kell-factor correction (KFC) filtering to the interpolated pixels depending on the NSAD value. This reduces the degradation of diagonals where the chosen direction appears very clear. Alternatively, Kell-factor filtering can always be applied in the vertical direction to the interpolated pixel. However, as mentioned above, this may degrade low gradient lines. To address this, it is preferable to only apply KFC vertical filtering if the NSAD value is high.

Another problem that may arise when selectively applying Kell-factor-correction is that certain regions of an image may always benefit from Kell-factor filtering but, because of their NSAD value, these may not be corrected by the Kell-factor corrector. To address this, the Kell-factor corrector 1170 is operable to always apply KFC vertical filtering when the direction for a particular pixel is within a particular threshold. For example, the KFC vertical filter may always be applied if the direction is −1, 0 or 1. In this case, to reduce storage requirements, a flag that states whether the direction is −1, 0 or 1 may be stored instead of storing the actual interpolation direction. For other directions, it is preferable to selectively apply the KFC vertical filter based on the NSAD values.

The Kell-factor corrector 1170 is also operable to apply horizontal filtering (horizontal KFC filtering) so as to smooth interpolated pixels in the horizontal direction as shown in FIG. 23. Here, the circles represent interpolated pixels and squares denote real pixels. The pixel 1500 to be interpolated and to which filtering is to be applied is denoted with the question mark "?". Filtering is applied in a horizontal direction. In the example of FIG. 23, a 5 tap horizontal filter is used, over a filter range shown schematically by a dark border 1510, symmetrically disposed about the interpolated pixel 1500.

As mentioned above, a suitable filter for use as the horizontal KFC filter may be a 5-tap symmetrical filter as was described above for the KFC vertical filter. Suitable filter values are the same as those used for the vertical filter as described above. However, a person skilled in the art will realise that any filter suitable for performing horizontal filtering may be used.

Although the KFC horizontal filter may be applied to every interpolated pixel, it is preferable to selectively apply the KFC filter so as to not degrade high-angle (near vertical lines). This may be accomplished by not applying the filter when the current pixel interpolation direction lies in a direction in which applying KFC horizontal filtering would be inappropriate. For example, the arrangement may be that the KFC horizontal filter is not applied when the current, left or right direction is zero or ±1. In this case, to reduce storage requirements, a flag that states whether the direction is −1, 0 or 1 may be stored instead of storing the actual interpolation direction. Additionally, the KFC horizontal filter may not be applied if the NSAD value of that pixel is larger than a certain threshold. Alternatively, the Kell-factor corrector 1170 is operable to not apply the KFC horizontal filter to any of the interpolated pixels. It will be appreciated that any combination of or all of the Kell-factor filtering methods described above may be applied to the interpolated pixels. Additionally, it will be appreciated that the above described Kell-factor filtering methods may be applied in any arbitrary direction with respect to the interpolated pixels.

Although the embodiments have been described in respect of interlace to progressive scan conversion, the same techniques could be applicable to altering the size (e.g. height) of an image such as a progressive scan image. For example, the techniques could perform a 1:3 or 1:4 scaling.

It will be appreciated that the invention can be implemented in programmable or semi-programmable hardware operating under the control of appropriate software. This could be a general purpose computer or arrangements such as an ASIC (application specific integrated circuit) or an FPGA (field programmable gate array). The software could be supplied on a storage medium such as a disk or solid state memory, or via a transmission medium such as a network or internet connection, or via combinations of these.

APPENDIX

Some example Parameters:

|  | YPbPr setting | RGB setting |
|---|---|---|
| C1 | −128 | −300 |
| C2 | 0 | 3 |
| $KFC_{Thresh}$ | 31 | 41 |
| C3 | 8 | 8 |
| C4 | 3 | 3 |
| C5 | 2 | 2 |
| C6 | 1 | 1 |
| C8 | 64 | 512 |
| HFC weighting | [2 4 5 4 2] | [2 4 5 4 2] |
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |

Example values of the parameter "w" are as follows:

| | |
|---|---|
| 5h × 4v block: | 12/1024 23/1024 28/1024 23/1024 12/1024 |
| | 32/1024 62/1024 77/1024 62/1024 32/1024 |
| | 32/1024 62/1024 77/1024 62/1024 32/1024 |
| | 12/1024 23/1024 28/1024 23/1024 12/1024 |
| 5h × 3v block: | 20/1024 39/1024 48/1024 39/1024 20/1024 |
| | 48/1024 94/1024 117/1024 94/1024 48/1024 |
| | 20/1024 39/1024 48/1024 39/1024 20/1024 |
| 1h × 2v block: | 128/256 |
| | 128/256 |
| 1h × 1v block: | 255/256 |

The invention claimed is:

1. An image processing apparatus in which output pixels for an output image are generated with respect to input pixels of an input image, a first subset of the output pixels being identical to respective input pixels and a second subset of the output pixels being additional pixels interpolated from respective groups of one or more input pixels, the apparatus comprising:
a band-stop spatial filter arrangement for filtering the second subset of pixels, the band-stop spatial filter arrangement not being applied to filter the first subset of output pixels, the band-stop spatial filter arrangement having a frequency response including a stop band that has a first frequency less than a Kell factor of the input image and a second frequencies greater than the Kell factor of the input such that high spatial frequencies within the stop band are attenuated in the output image.

2. The apparatus according to claim 1, in which the output pixels generated with respect to the input pixels of the input image are selected in accordance with an image feature direction in the input image, the apparatus comprising a means for comparing blocks of input pixels of the input image, the blocks of input pixels being disposed with respect to a pixel position under test so that a degree of correlation between the blocks is indicative of the image feature direction applicable to that pixel position.

3. The apparatus according to claim 2, in which the band-stop spatial filter arrangement is selectively operable with respect to an output pixel in dependence upon the degree of correlation between the blocks of input pixels used to select the image feature direction for that output pixel.

4. The apparatus according to claim 3, in which, for image feature directions that define lines whose gradients lie within a range between a vertical and a threshold gradient, the operation of a vertical filter is independent of the degree of correlation but selectively operable in dependence on the degree of correlation for other image feature directions.

5. The apparatus according to claim 2, in which the band-stop spatial filter arrangement is selectively operable with respect to an output pixel in dependence upon the image feature direction applicable to that output pixel position.

6. The apparatus according to claim 5, in which a horizontal filter is not applied to the output pixel if the image feature direction applicable to that output pixel defines a line whose gradient lies within a range between a vertical and a threshold gradient.

7. The apparatus according to claim 1, comprising a means for restricting the output of the band-stop spatial filter arrangement with respect to a pixel position in dependence on a range of pixel values defined by values of a set of pixels at predetermined positions with respect to that pixel position.

8. The apparatus according to claim 1, in which the filter arrangement comprises a vertical filter and the band-stop spatial filter arrangement has a response such that high vertical frequencies within the stop band are attenuated in the output image.

9. The apparatus according to claim 1, in which the filter arrangement comprises a horizontal filter and the band-stop spatial filter arrangement has a response such that high horizontal frequencies within the stop band are attenuated in the output image.

10. A vision mixing apparatus comprising: an image processing apparatus in which output pixels for an output image are generated with respect to input pixels of an input image, a first subset of the output pixels being identical to respective input pixels and a second subset of the output pixels being additional pixels interpolated from respective groups of one or more input pixels, the image processing apparatus including:
a band-stop spatial filter arrangement for filtering the second subset of pixels, the band-stop spatial filter arrangement not being applied to filter the first subset of output pixels, the band-stop spatial filter arrangement having a frequency response including a stop band that has a first frequency less than a Kell factor of the input image and a second frequency greater than the Kell factor of the input image such that high spatial frequencies within the stop band are attenuated in the output image.

11. A video display apparatus comprising: an image processing apparatus in which output pixels for an output image are generated with respect to input pixels of an input image, a first subset of the output pixels being identical to respective input pixels and a second subset of the output pixels being additional pixels interpolated from respective groups of one or more input pixels, the image processing apparatus including:
a band-stop spatial filter arrangement for filtering the second subset of pixels, the band-stop spatial filter arrangement not being applied to filter the first subset of output pixels, the band-stop spatial filter arrangement having a frequency response including a stop band that has a first frequency less than a Kell factor of the input image and a second frequency greater than the Kell factor of the input image such that high spatial frequencies within the stop band are attenuated in the output image.

12. An image processing method in which output pixels for an output image are generated with respect to input pixels of an input image, a first subset of the output pixels being identical to respective input pixels and a second subset of the output pixels being additional pixels interpolated from respective groups of one or more input pixels, the method comprising the steps of:
filtering, using a spatial filter arrangement, the second subset of pixels and not filtering, using the spatial filter arrangement, the first subset of output pixels, the spatial filter arrangement having a frequency response including a stop band that has a first frequency less than a Kell factor of the input image and a second frequency greater than the Kell factor of the input image such that high spatial frequencies within the stop band are attenuated in the output image.

13. The method according to claim 12, in which the filtering is carried out in a vertical direction and the spatial filter arrangement has a response such that high vertical frequencies within the stop band are attenuated in the output image.

14. The method according to claim 12, in which the filtering is carried out in a horizontal direction and the spatial filter arrangement has a response such that high horizontal frequencies within the stop band are attenuated in the output image.

15. A non-transitory computer-readable storage medium having executable instructions stored therein, which when executed by a processor causes the processor to execute an image processing method in which output pixels for an output image are generated with respect to input pixels of an input image, a first subset of the output pixels being identical to respective input pixels and a second subset of the output pixels being additional pixels interpolated from respective groups of one or more input pixels, the method comprising the steps of:

filtering, using a spatial filter arrangement, the second subset of pixels and not filtering, using the spatial filter arrangement, the first subset of output pixels, the spatial filter arrangement having a frequency response including a stop band that has a first frequency less than a Kell factor of the input image and a second frequency greater than the Kell factor of the input image such that high spatial frequencies within the stop band are attenuated in the output image.

* * * * *